(12) United States Patent
Maeda et al.

(10) Patent No.: US 9,155,435 B2
(45) Date of Patent: Oct. 13, 2015

(54) CYCLONE SEPARATION DEVICE AND ELECTRIC VACUUM CLEANER

(75) Inventors: Tsuyoshi Maeda, Tokyo (JP); Marika Riku, Tokyo (JP); Akihiro Iwahara, Saitama (JP); Daisuke Kondo, Saitama (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/377,922

(22) PCT Filed: Jul. 3, 2012

(86) PCT No.: PCT/JP2012/066982
§ 371 (c)(1),
(2), (4) Date: Aug. 11, 2014

(87) PCT Pub. No.: WO2013/128664
PCT Pub. Date: Sep. 6, 2013

(65) Prior Publication Data
US 2015/0026919 A1    Jan. 29, 2015

(30) Foreign Application Priority Data

Feb. 29, 2012    (JP) .................................. 2012-043579

(51) Int. Cl.
*A47L 9/16*    (2006.01)
*B01D 45/16*    (2006.01)
(Continued)

(52) U.S. Cl.
CPC ............... *A47L 9/1608* (2013.01); *A47L 5/365* (2013.01); *A47L 9/0081* (2013.01); *A47L 9/165* (2013.01);
(Continued)

(58) Field of Classification Search
CPC ..... A47L 9/1608; A47L 9/165; A47L 9/1683; A47L 9/1666; B04C 5/185; B01D 45/16
See application file for complete search history.

(56) References Cited

U.S. PATENT DOCUMENTS 5,078,761 A    1/1992    Dyson
2006/0254226 A1*    11/2006    Jeon ................................ 55/345
(Continued)

FOREIGN PATENT DOCUMENTS

| JP | 05-176871 A | 7/1993 |
| JP | 2011-000450 A | 1/2011 |
| WO | 01/45853 A1 | 6/2001 |

OTHER PUBLICATIONS

International Preliminary Report on Patentability mailed Sep. 12, 2014 for the corresponding international application No. PCT/JP2012/066982 (English translation only).
(Continued)

*Primary Examiner* — Dung Van Nguyen
(74) *Attorney, Agent, or Firm* — Posz Law Group, PLC

(57) ABSTRACT

A dust collection unit includes a swirl chamber, dust collection chambers, a discharge pipe, an inlet pipe, a bypass inlet, and a bypass inlet airflow passage. The swirl chamber swirls, along a side wall, dust-containing air having entered from a primary inlet and a secondary inlet having a smaller opening area than the primary inlet, and separates dust from the dust-containing air. The dust separated by the swirl chamber is collected by the dust collection chambers. A discharge pipe has a discharge opening. The inlet pipe allows the dust-containing air to flow from the primary inlet into the swirl chamber. A bypass inlet is formed in the inlet pipe. The bypass inlet airflow passage allows the dust-containing air in the inlet pipe having entered from the bypass inlet to flow from the secondary inlet into the swirl chamber.

18 Claims, 21 Drawing Sheets

(51) Int. Cl.
B04C 5/185 (2006.01)
A47L 5/36 (2006.01)
A47L 9/00 (2006.01)
A47L 9/22 (2006.01)

(52) U.S. Cl.
CPC ............. *A47L 9/1666* (2013.01); *A47L 9/1683* (2013.01); *A47L 9/22* (2013.01); *B01D 45/16* (2013.01); *B04C 5/185* (2013.01)

(56) References Cited

U.S. PATENT DOCUMENTS

2009/0249577 A1* 10/2009 Ni .................................. 15/326
2010/0089014 A1* 4/2010 Zhou .............................. 55/322
2010/0132316 A1* 6/2010 Ni .................................. 55/343

OTHER PUBLICATIONS

Office Action dated Nov. 25, 2014 issued in corresponding TW patent application No. 101134095 (and English translation).
International Search Report of the International Searching Authority mailed Aug. 7, 2012 for the corresponding international application No. PCT/JP2012/066982 (and English translation).
Office Action mailed Jun. 12, 2014 issued in corresponding JP patent application No. 2012-043579 (and English translation).
Office Action mailed Jun. 15, 2015 in the corresponding Australian patent application No. 2012371846.

* cited by examiner

CYCLONE SEPARATION DEVICE AND ELECTRIC VACUUM CLEANER

CROSS REFERENCE TO RELATED APPLICATIONS

This application is a U.S. national stage application of International Application No. PCT/JP2012/066982 filed on Jul. 3, 2012, and is based on Japanese Patent Application No. 2012-043579 filed on Feb. 9, 2012, the disclosures of which are incorporated by reference.

TECHNICAL FIELD

The present invention relates to a cyclone separation device, and an electric vacuum cleaner including the cyclone separation device.

BACKGROUND ART

Patent Literature 1 mentioned below describes an electric vacuum cleaner including a cyclone separation device. In the cyclone separation device described in Patent Literature 1, two openings are formed in a cylindrical container, and air is taken from the two openings into the container (for example, see FIG. 8 in Patent Literature 1).

In the cyclone separation device having such a configuration, areas of the openings must be reduced to ensure a flow velocity of air flowing into the container. Thus, the openings and airflow passages leading to the openings may be clogged with dust.

The cyclone separation device described in Patent Literature 1 includes another device having a cyclone separation function and provided on an upstream side of the container in order to prevent the openings and the airflow passages from being clogged with dust. That is, the cyclone separation device described in Patent Literature 1 uses the device to previously remove large dust, and takes air from which the large dust is removed into the container.

CITATION LIST

Patent Literature

Patent Literature 1: Japanese Patent Laid-Open No. 5-176871

SUMMARY OF INVENTION

Technical Problem

The cyclone separation device described in Patent Literature 1 requires a device for previously removing large dust, which increases a size of the entire cyclone separation device.

The present invention is achieved to solve the problems such as the one described above, and has an object to provide a cyclone separation device that can increase dust separation performance and reduce noise without increasing a size of the device, and an electric vacuum cleaner including such a cyclone separation device.

Solution to Problem

A cyclone separation device of the present invention is a device which comprises a swirl chamber that swirls, along a side wall thereof, dust-containing air entered from a primary inlet and a secondary inlet having an opening area smaller than an opening area of the primary inlet, and separates dust from the dust-containing air, a dust collection chamber that collects the dust separated by the swirl chamber, a discharge pipe having a discharge opening for discharging air in the swirl chamber, an inlet pipe that allows the dust-containing air to flow from the primary inlet into the swirl chamber, a bypass inlet connected to the inlet pipe, and a bypass inlet airflow passage that allows the dust-containing air in the inlet pipe to enter thereinto from the bypass inlet and to flow from the secondary inlet into the swirl chamber.

An electric vacuum cleaner of the present invention is a cleaner which comprises the cyclone separation device, and an air blower for generating a predetermined airflow in the cyclone separation device.

Advantageous Effects of Invention

According to the present invention, the cyclone separation device and the electric vacuum cleaner including the cyclone separation device can increase dust separation performance and reduce noise without increasing a size of the device.

DESCRIPTION OF EMBODIMENTS

Figure 1:
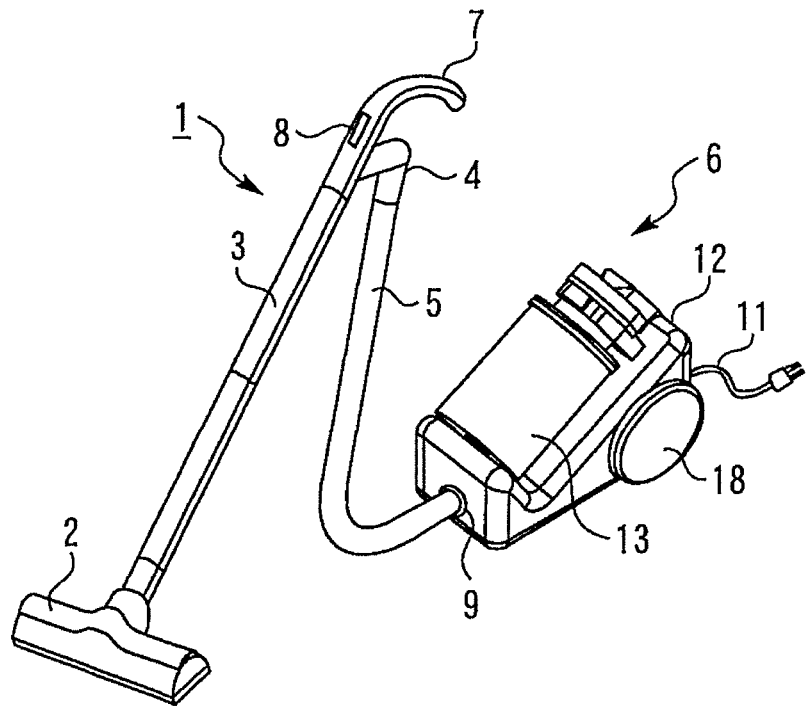
FIG. 1 is a perspective view showing an electric vacuum cleaner according to Embodiment 1 of the present invention.

The present invention will be described in detail with reference to the attached drawings. In the drawings, the same or corresponding components are denoted by the same reference numerals. Redundant descriptions are appropriately simplified or omitted.

Embodiment 1

FIG. 1 is a perspective view showing an electric vacuum cleaner according to Embodiment 1 of the present invention.

As shown in FIG. 1, essential portions of the electric vacuum cleaner 1 includes a suction opening body 2, a suction pipe 3, a connection pipe 4, a suction hose 5, and a vacuum cleaner body 6.

The suction opening body 2 sucks dust on a floor surface with air from an opening formed downward. The suction opening body 2 includes a connection portion for exhausting air in a longitudinally middle portion.

The suction pipe 3 is formed of a straight cylindrical member. An end on one side (intake side) of the suction pipe 3 is connected to the connection portion of the suction opening body 2.

The connection pipe 4 is formed of a cylindrical member bent in the middle. An end on one side (intake side) of the connection pipe 4 is connected to the other end of the suction pipe 3. A handle 7 is provided on the connection pipe 4. The handle 7 is gripped and operated by a person who is cleaning. The handle 7 has an operation switch 8 for controlling operation of the electric vacuum cleaner 1.

The suction hose 5 is formed of a flexible bellows member. An end on one side (intake side) of the suction hose 5 is connected to the other end of the connection pipe 4.

The vacuum cleaner body 6 separates dust from air containing dust (dust-containing air), and discharges air (clean air) from which the dust is removed (for example, returns the air to a room). The vacuum cleaner body 6 has a hose connection opening 9 in a front end. The other end of the suction hose 5 is connected to the hose connection opening 9 in the vacuum cleaner body 6.

The vacuum cleaner body 6 includes an electric air blower 10 (not shown in FIG. 1), and a power cord 11. The power cord 11 is wound around a cord reel (not shown) in the vacuum cleaner body 6. The power cord 11 is connected to an external power source to energize internal devices such as the electric air blower 10. The electric air blower 10 is driven by energization to perform predetermined suction depending on operation of the operation switch 8.

Insides of the suction opening body 2, the suction pipe 3, the connection pipe 4, and the suction hose 5 are continuously formed. When the electric air blower 10 performs suction, dust on the floor surface is sucked with air into the suction opening body 2. Dust-containing air sucked into the suction opening body 2 is fed through the suction opening body 2, the suction pipe 3, the connection pipe 4, and the suction hose 5 to the vacuum cleaner body 6. As such, the suction opening body 2, the suction pipe 3, the connection pipe 4, and the suction hose 5 form an airflow passage for allowing dust-containing air to flow into the vacuum cleaner body 6 from outside.

Figure 2:
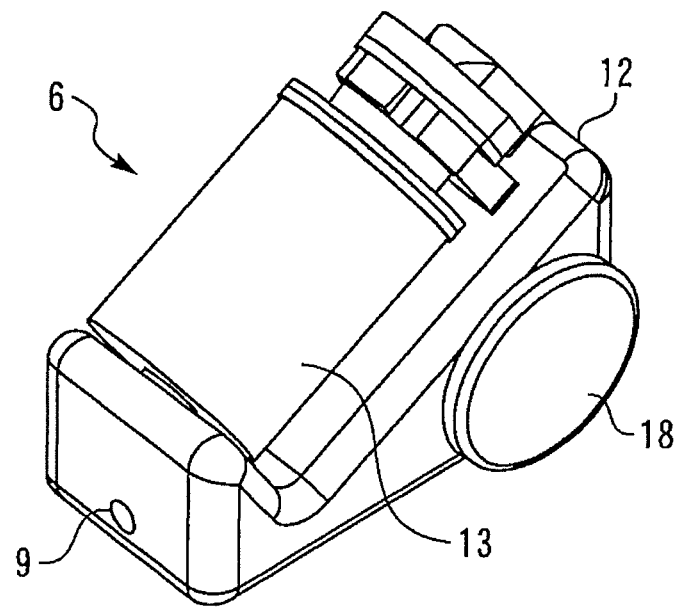
FIG. 2 is a perspective view showing a vacuum cleaner body of the electric vacuum cleaner according to Embodiment 1 of the present invention.
Figure 3:
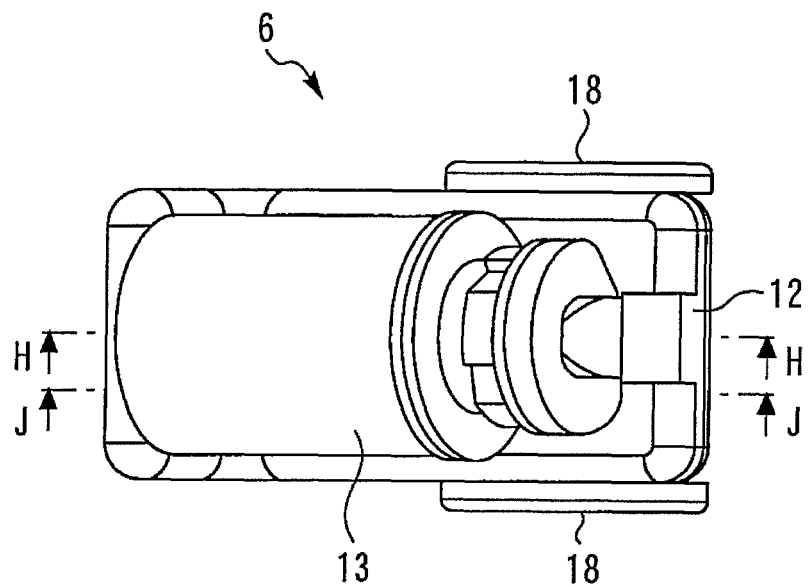
FIG. 3 is a plan view showing the vacuum cleaner body of the electric vacuum cleaner according to Embodiment 1 of the present invention.

FIG. 2 is a perspective view showing the vacuum cleaner body of the electric vacuum cleaner according to Embodiment 1 of the present invention. FIG. 3 is a plan view showing the vacuum cleaner body of the electric vacuum cleaner according to Embodiment 1 of the present invention.

The vacuum cleaner body 6 includes a housing unit 12 and a dust collection unit 13. The housing unit 12 houses various devices other than the dust collection unit 13. The dust collection unit 13 is removably provided on the housing unit 12.

Figure 4:
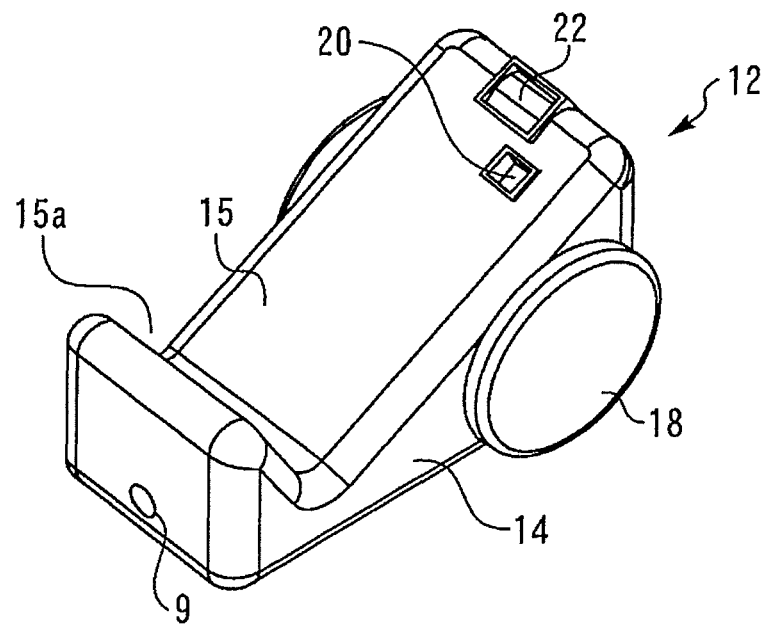
FIG. 4 is a perspective view showing a housing unit of the electric vacuum cleaner according to Embodiment 1 of the present invention.
Figure 5:
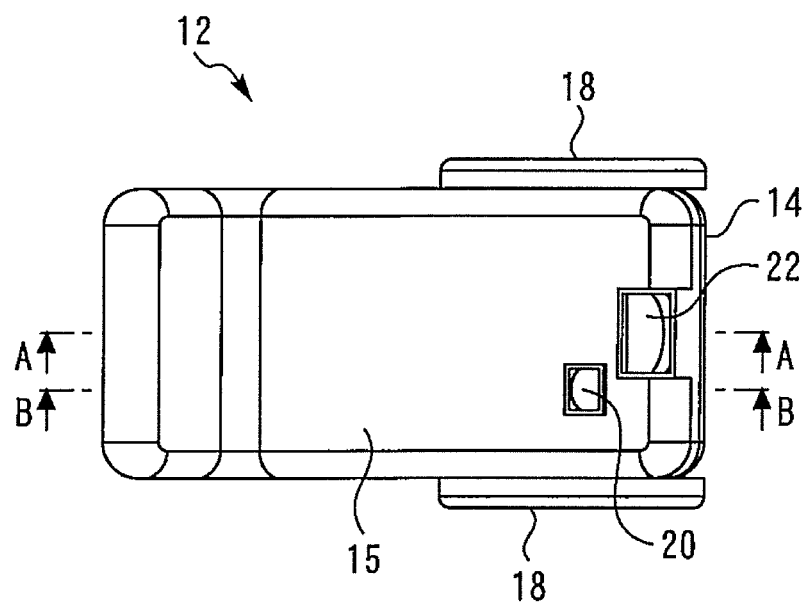
FIG. 5 is a plan view of the housing unit of the electric vacuum cleaner according to Embodiment 1 of the present invention.
Figure 6:
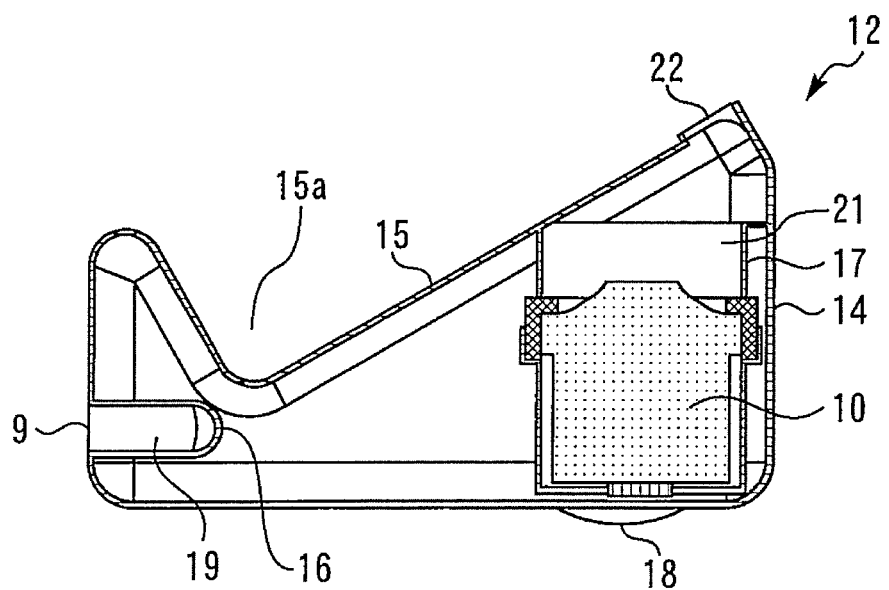
FIG. 6 is an A-A sectional view of the housing unit shown in FIG. 5.
Figure 7:
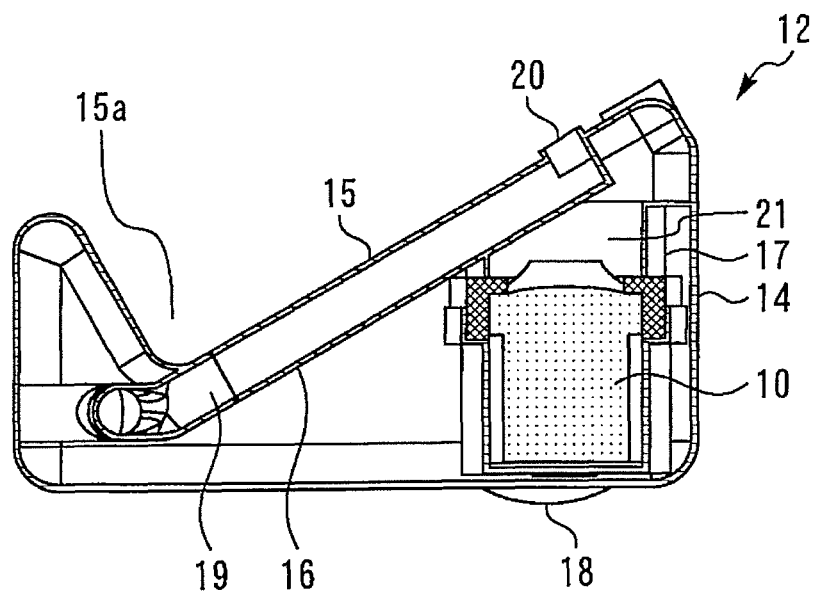
FIG. 7 is a B-B sectional view of the housing unit shown in FIG. 5.

FIG. 4 is a perspective view showing the housing unit of the electric vacuum cleaner according to Embodiment 1 of the present invention. FIG. 5 is a plan view of the housing unit of the electric vacuum cleaner according to Embodiment 1 of the present invention. FIGS. 4 and 5 show the state in which the dust collection unit 13 is removed from the housing unit 12. FIG. 6 is an A-A sectional view of the housing unit shown in FIG. 5. FIG. 7 is a B-B sectional view of the housing unit shown in FIG. 5.

The housing unit 12 includes the devices described above, and also housing bodies 14 and 15, an intake airflow passage forming portion 16, an exhaust airflow passage forming portion 17, and wheels 18.

The housing body 14 is formed of a box-like member (for example, a molded component) with openings on front and upper sides. The electric air blower 10 and the cord reel are housed in the housing body 14. A portion from a rear end to a predetermined position closer to a front side of the housing body 14 has an inclined upper surface with a higher rear side and a lower front side. A portion on a front side of the predetermined position of the housing body 14 has an inclined upper surface with a lower rear side and a higher front side.

The housing body 15 is provided on the housing body 14 so as to close the openings formed in the housing body 14. An upper surface near the front end of the housing body 14 faces obliquely rearward, and an upper surface of the other portion faces obliquely forward. Thus, the housing body 15 is partially formed into an L shape on side view in accordance with the shape of the upper surfaces of the housing body 14. The L-shaped portion of the housing body 15 forms a housing portion 15a thereon. The housing portion 15a includes a space for housing the dust collection unit 13. When the dust collection unit 13 is properly mounted to the housing unit 12, essential portions of the dust collection unit 13 are placed in the housing portion 15a, that is, on the housing body 15 (housing unit 12).

The intake airflow passage forming portion 16 forms an intake airflow passage 19 for leading dust-containing air to the dust collection unit 13 in the vacuum cleaner body 6. The intake airflow passage forming portion 16 has one end opening in a front surface of the vacuum cleaner body 6. The intake airflow passage forming portion 16 passes through an internal space of the housing body 14, and has the other end opening in an upper surface (housing body 15) of the housing unit 12. The one end of the intake airflow passage forming portion 16 forms the hose connection opening 9. The other end of the intake airflow passage forming portion 16 forms a connection opening 20 to the dust collection unit 13. The connection opening 20 is placed closer to the rear end and one side on the upper surface of the housing unit 12.

The dust collection unit 13 separates dust from the dust-containing air, and temporarily stores the separated dust. The dust collection unit 13 swirls the dust-containing air therein to separate dust from air by a centrifugal force. That is, the dust collection unit 13 has a cyclone separation function.

A specific configuration and function of the dust collection unit 13 will be described later.

The exhaust airflow passage forming portion 17 forms an exhaust airflow passage 21 for leading air discharged from the dust collection unit 13 (clean air from which dust is removed by the dust collection unit 13) to an exhaust opening (not shown) in the vacuum cleaner body 6. One end of the exhaust airflow passage forming portion 17 opens in the upper surface (housing body 15) of the housing unit 12. The exhaust airflow passage forming portion 17 passes through the internal space of the housing body 14, and has the other end opening outward of the housing unit 12. The one end of the exhaust airflow passage forming portion 17 forms a connection opening 22 to the dust collection unit 13. The other end of the exhaust airflow passage forming portion 17 forms an exhaust opening. The connection opening 22 is placed in a middle closer to the rear end on the upper surface of the housing unit 12.

The electric air blower 10 generates an air flow in airflow passages formed in the electric vacuum cleaner 1 (an airflow passage for allowing dust-containing air to flow into the vacuum cleaner body 6, the intake airflow passage 19, an airflow passage in the dust collection unit 13 described later, and the exhaust airflow passage 21). The electric air blower 10 is placed in the exhaust airflow passage 21 in a predetermined position closer to the rear end of the housing unit 12.

When the electric air blower 10 starts suction, an airflow (suction air) is generated in the airflow passages formed in the electric vacuum cleaner 1. The dust-containing air sucked into the suction opening body 2 is taken from the hose connection opening 9 into the vacuum cleaner body 6. The dust-containing air having flowed into the vacuum cleaner body 6 is fed through the intake airflow passage 19 from the connection opening 20 to the dust collection unit 13. The airflow generated in the dust collection unit 13 will be described later. The air (clean air) discharged from the dust collection unit 13 flows into the exhaust airflow passage 21, and passes through the electric air blower 10 in the exhaust airflow passage 21. The air having passed through the electric air blower 10 further travels through the exhaust airflow passage 21, and is discharged from the exhaust opening to the outside of the vacuum cleaner body 6 (electric vacuum cleaner 1).

Next, also with reference to FIGS. 8 to 18, the dust collection unit 13 will be described in detail.

Figure 8:
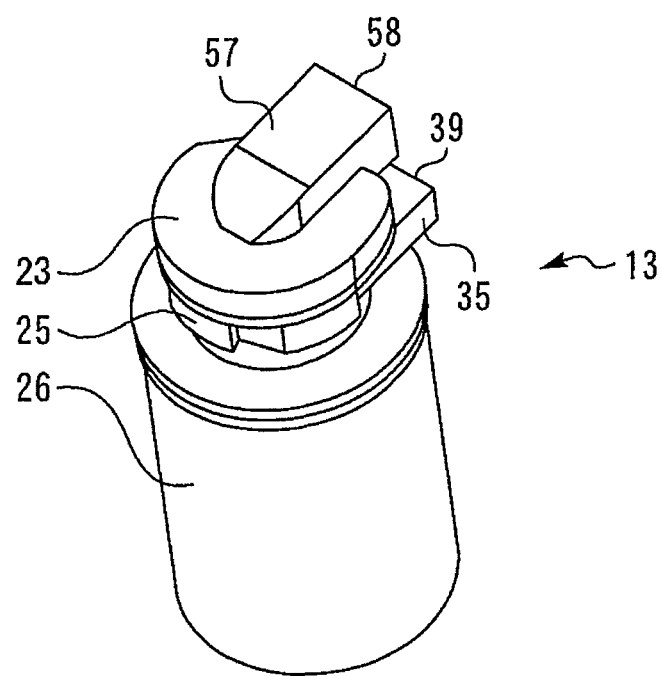
FIG. 8 is a perspective view showing a dust collection unit of the electric vacuum cleaner according to Embodiment 1 of the present invention.
Figure 9:
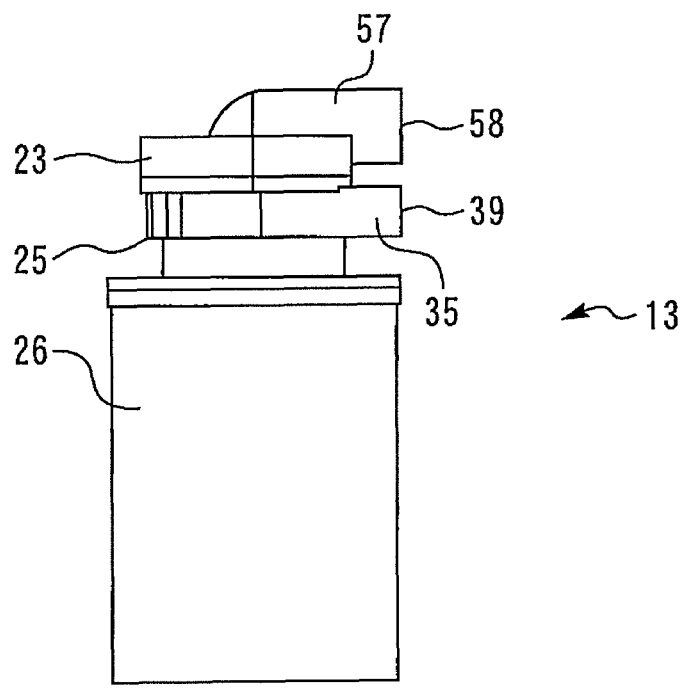
FIG. 9 is a side view showing the dust collection unit of the electric vacuum cleaner according to Embodiment 1 of the present invention.
Figure 10:
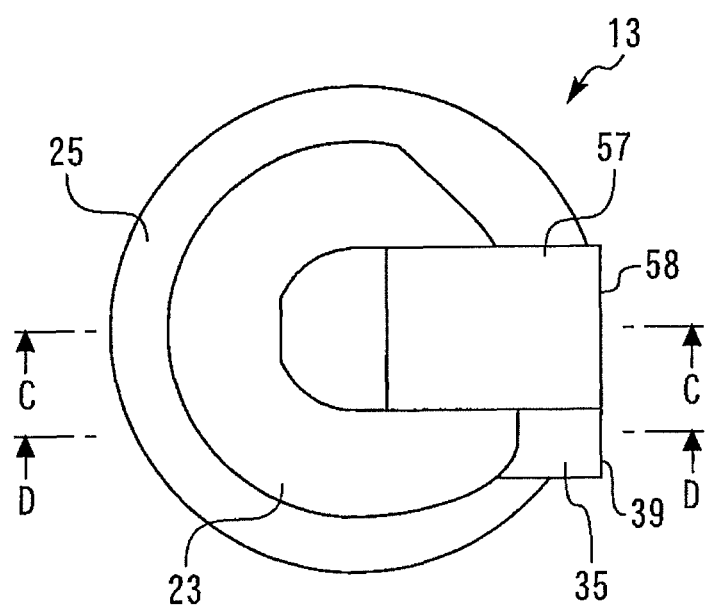
FIG. 10 is a plan view showing the dust collection unit of the electric vacuum cleaner according to Embodiment 1 of the present invention.
Figure 11:
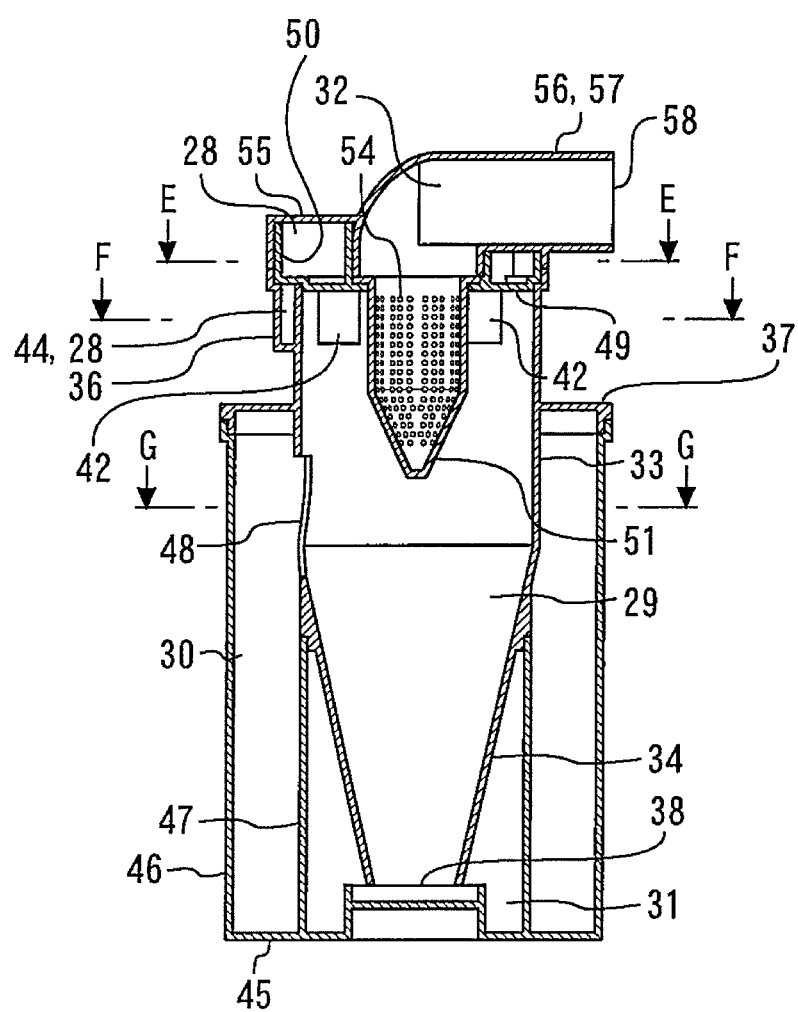
FIG. 11 is a C-C sectional view of the dust collection unit in FIG. 10.
Figure 12:
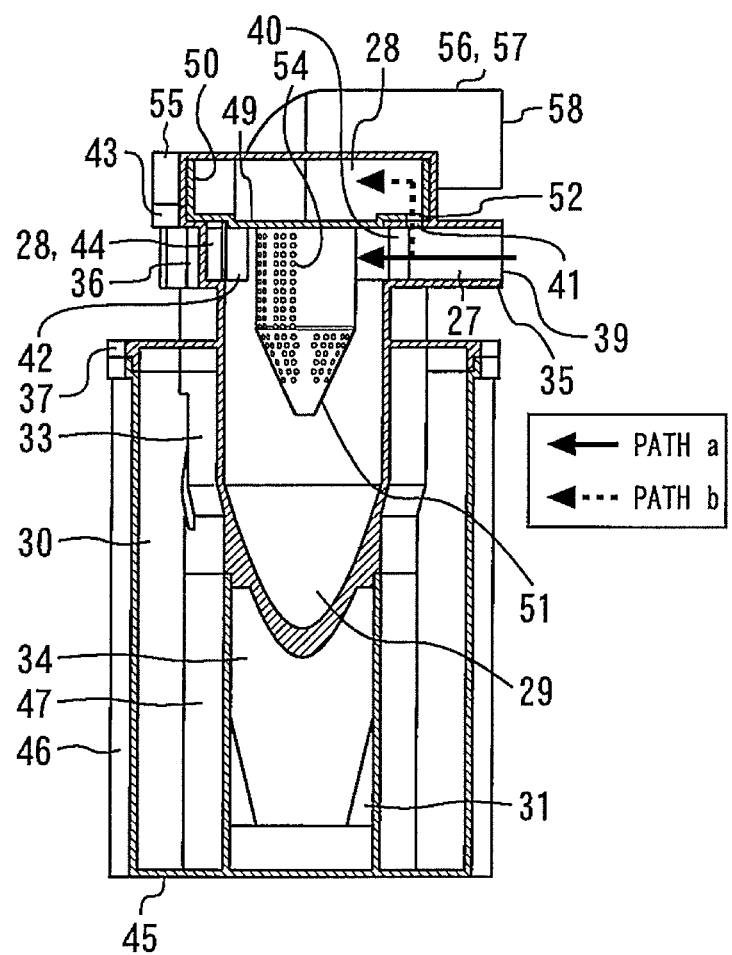
FIG. 12 is a D-D sectional view of the dust collection unit in FIG. 10.
Figure 13:
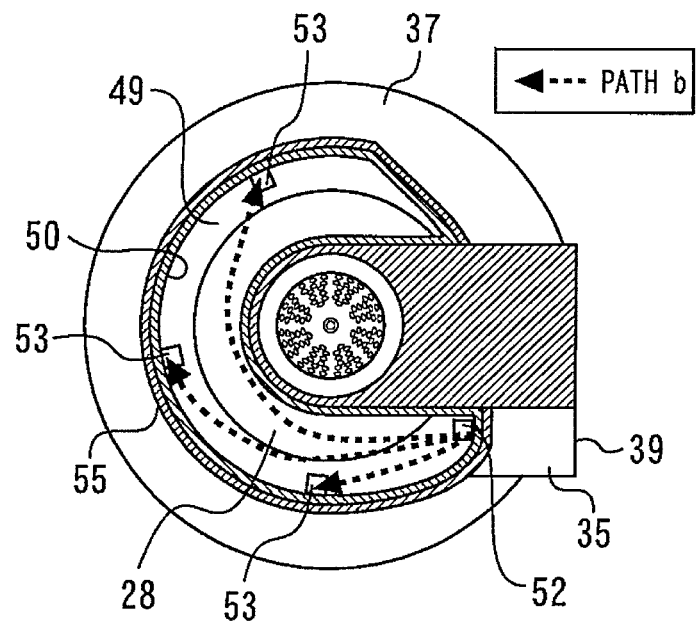
FIG. 13 is an E-E sectional view of the dust collection unit in FIG. 11.
Figure 14:
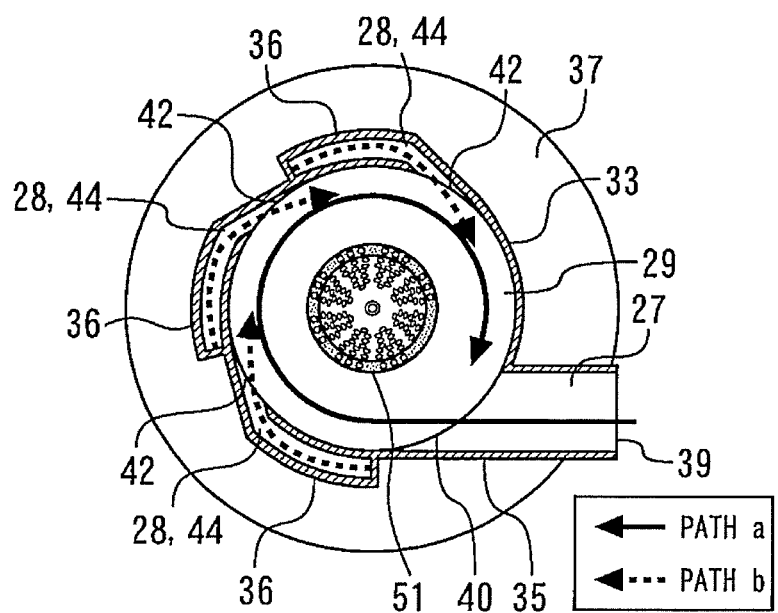
FIG. 14 is an F-F sectional view of the dust collection unit in FIG. 11.
Figure 15:
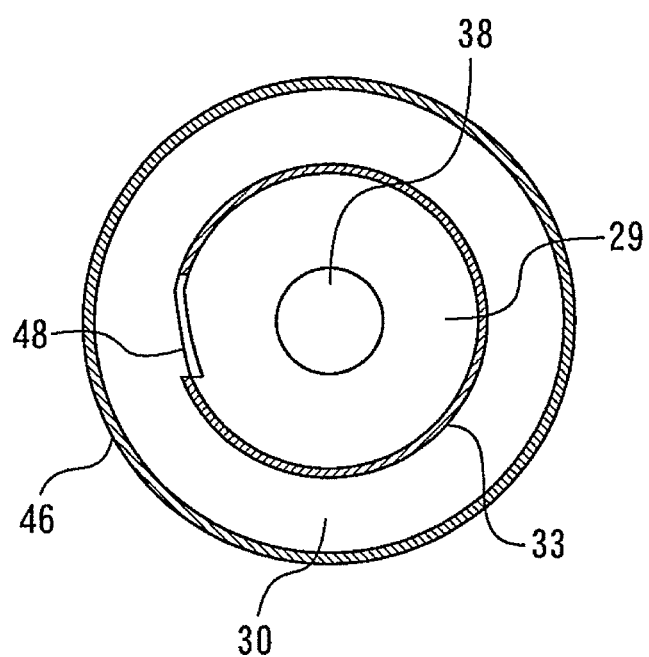
FIG. 15 is a G-G sectional view of the dust collection unit in FIG. 11.
Figure 16:
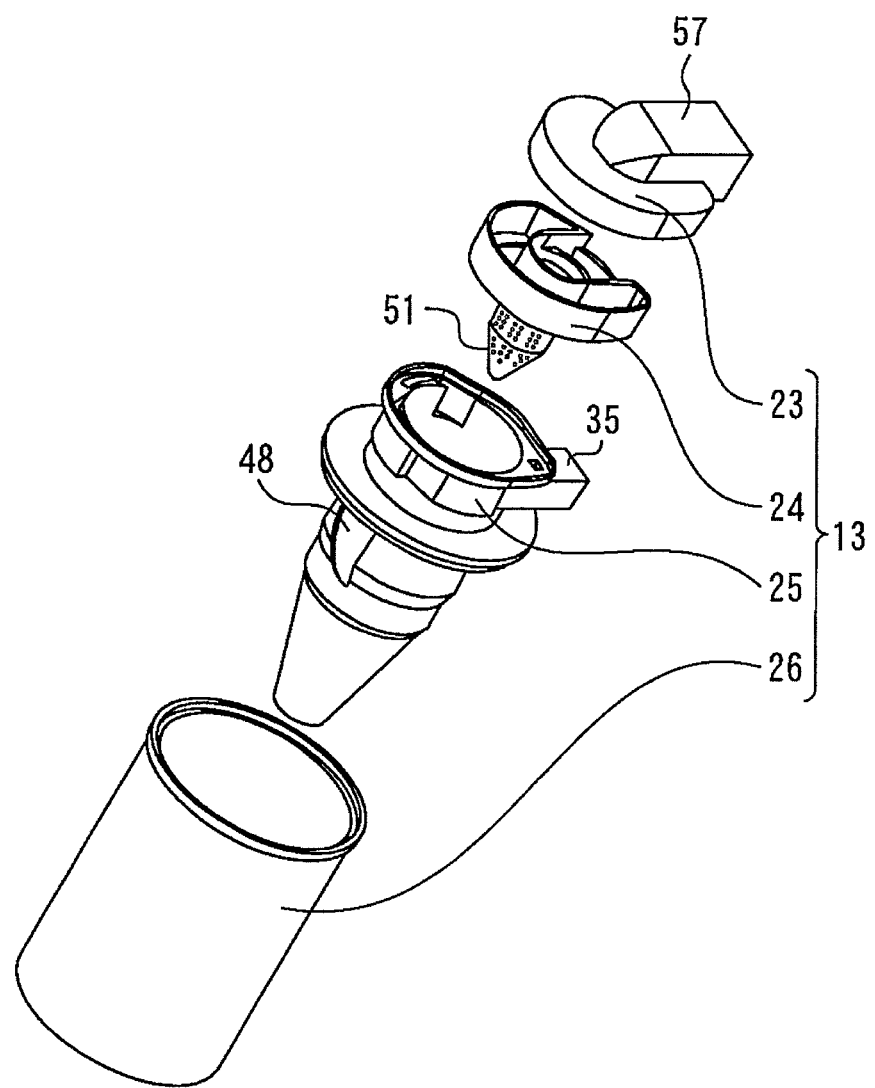
FIG. 16 is an exploded view of the dust collection unit of the electric vacuum cleaner according to Embodiment 1 of the present invention.

FIG. 8 is a perspective view showing the dust collection unit of the electric vacuum cleaner according to Embodiment 1 of the present invention. FIG. 9 is a side view showing the dust collection unit of the electric vacuum cleaner according to Embodiment 1 of the present invention. FIG. 10 is a plan view showing the dust collection unit of the electric vacuum cleaner according to Embodiment 1 of the present invention. FIG. 11 is a C-C sectional view of the dust collection unit in FIG. 10. FIG. 12 is a D-D sectional view of the dust collection unit in FIG. 10. FIG. 13 is an E-E sectional view of the dust collection unit in FIG. 11. FIG. 14 is an F-F sectional view of the dust collection unit in FIG. 11. FIG. 15 is a G-G sectional view of the dust collection unit in FIG. 11. FIG. 16 is an exploded view of the dust collection unit of the electric vacuum cleaner according to Embodiment 1 of the present invention.

The dust collection unit 13 generally has a substantially cylindrical shape. The dust collection unit 13 includes a discharge portion case 23, a bypass portion case 24, an inlet portion case 25, and a dust collection portion case 26.

Figure 17:
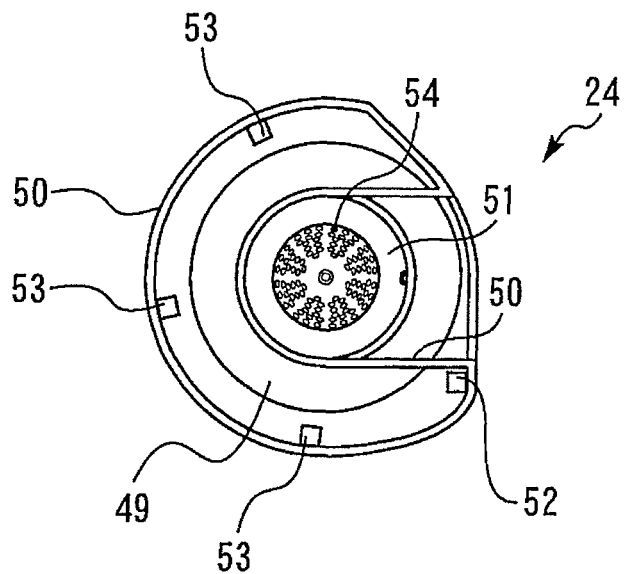
FIG. 17 is a plan view showing a bypass portion case in the dust collection unit of the electric vacuum cleaner according to Embodiment 1 of the present invention.
Figure 18:
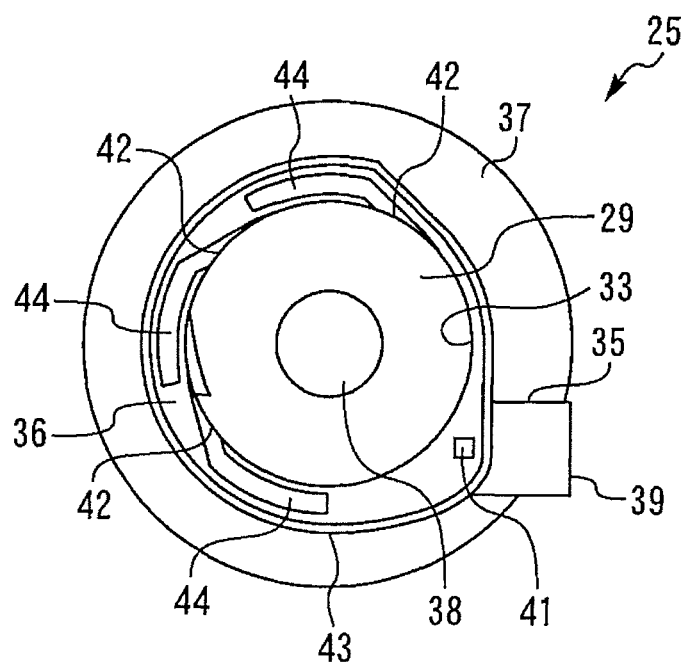
FIG. 18 is a plan view showing an inlet portion case in the dust collection unit of the electric vacuum cleaner according to Embodiment 1 of the present invention.

FIG. 17 is a plan view showing the bypass portion case in the dust collection unit of the electric vacuum cleaner according to Embodiment 1 of the present invention. FIG. 18 is a plan view showing the inlet portion case in the dust collection unit of the electric vacuum cleaner according to Embodiment 1 of the present invention.

In the descriptions on the dust collection unit 13 below, upper and lower sides are specified with reference to the direction in FIG. 9.

The discharge portion case 23, the bypass portion case 24, the inlet portion case 25, and the dust collection portion case 26 are formed of, for example, molded components. The discharge portion case 23, the bypass portion case 24, the inlet portion case 25, and the dust collection portion case 26 are configured to be disassembled into a state in FIG. 16 and assembled into a state in FIG. 8 by predetermined operation (for example, operation of a lock mechanism). Also, only the dust collection portion case 26 may be removed from the state in FIG. 8.

Any one or more of the cases 23 to 26 are properly placed, and thus an inlet airflow passage 27, a bypass inlet airflow passage 28, a swirl chamber 29, a zero-order dust collection chamber 30, a primary dust collection chamber 31, and an outlet airflow passage 32 are formed in the dust collection unit 13.

The inlet portion case 25 includes a cylindrical portion 33, a conical portion 34, an inlet pipe 35, a bypass airflow passage forming portion 36, and a connection portion 37.

The cylindrical portion 33 has a hollow cylindrical shape. The cylindrical portion 33 is placed so that a central axis thereof is vertically directed. The conical portion 34 has a hollow truncated conical shape. The conical portion 34 is vertically placed so that a central axis thereof matches the central axis of the cylindrical portion 33. An upper end of the conical portion 34 is connected to a lower end of the cylindrical portion 33, and the conical portion 34 is provided to extend downward from the lower end of the cylindrical portion 33 with a diameter decreasing downward. Thus, a lower end of the conical portion 34 opens downward (toward the central axis). The opening formed in the lower end of the conical portion 34 is a primary opening 38.

A continuous space formed by an internal space of the cylindrical portion 33 and an internal space of the conical portion 34 constitutes the swirl chamber 29. The swirl chamber 29 is a space for swirling dust-containing air.

The inlet pipe 35 leads dust-containing air having passed through the intake airflow passage 19 into the inside of the cylindrical portion 33 (swirl chamber 29). An internal space of the inlet pipe 35 forms the inlet airflow passage 27. The inlet airflow passage 27 is one of the airflow passages for allowing dust-containing air to flow from the intake airflow passage 19 into the swirl chamber 29.

The inlet pipe 35 has, for example, a hollow square shape and is connected to the cylindrical portion 33. The inlet pipe 35 has one end opening outward, and the other end opening inside the cylindrical portion 33. The one end of the inlet pipe 35 forms a unit inlet 39 for taking the dust-containing air into the dust collection unit 13. The other end of the inlet pipe 35 forms a primary inlet 40 for taking the dust-containing air having passed through the inlet airflow passage 27 into the inside of the cylindrical portion 33 (swirl chamber 29).

The inlet pipe 35 is connected to an upper portion of the cylindrical portion 33. Thus, the primary inlet 40 is formed in the upper portion of the cylindrical portion 33 (an uppermost portion of a side wall that forms the swirl chamber 29). The inlet pipe 35 is formed of a straight member. The inlet pipe 35 has an axis perpendicular to the central axis of the cylindrical portion 33, and placed tangentially of the cylindrical portion 33.

A square opening communicating with the internal space (inlet airflow passage 27) is formed in an upper surface of the inlet pipe 35. The opening provided in an upper wall that forms the inlet airflow passage 27 is a bypass inlet 41. The bypass inlet 41 is an opening for taking a part of the dust-containing air in the inlet airflow passage 27 into the bypass inlet airflow passage 28. The dust collection unit 13 includes the inlet airflow passage 27, and also the bypass inlet airflow passage 28, as airflow passages for allowing the dust-containing air to flow from the intake airflow passage 19 into the swirl chamber 29.

The bypass inlet airflow passage 28 is formed by parts of the discharge portion case 23, the bypass portion case 24, and the inlet portion case 25. The dust-containing air having been discharged from the intake airflow passage 19 through the bypass inlet 41 (that is, having flowed into the bypass inlet airflow passage 28) passes through the bypass inlet airflow passage 28, and is then taken from a secondary inlet 42 into the inside of the cylindrical portion 33 (swirl chamber 29).

The bypass airflow passage forming portion 36 is provided on an upper portion of the cylindrical portion 33 so as to surround the cylindrical portion 33. The bypass portion case 24 is placed on an upper surface of the bypass airflow passage forming portion 36 in close contact therewith. Thus, the upper surface of the bypass airflow passage forming portion 36 is formed to be flat. Also, a rising portion 43 for determining a mounting direction of the bypass portion case 24 is provided at an edge of the upper surface of the bypass airflow passage forming portion 36.

The bypass airflow passage forming portion 36 has three grooves 44 opening upward. The groove 44 is formed along an outer peripheral surface of the cylindrical portion 33 outside the cylindrical portion 33. The groove 44 is formed so that one end side is closer to the cylindrical portion 33 in a direction of the dust-containing air swirling in the swirl chamber 29 (swirl direction). One end of the groove 44 opens in the cylindrical portion 33.

The bypass portion case 24 is placed on the bypass airflow passage forming portion 36 to close the upper side of the groove 44, thereby forming a part (rear half) of the bypass inlet airflow passage 28. Also, the bypass portion case 24 is placed on the bypass airflow passage forming portion 36 to close the upper side of the opening at one end of the groove 44, thereby forming the secondary inlet 42. In this embodiment, the three grooves 44 are formed, and thus three secondary inlets 42 are provided in the side wall that forms the swirl chamber 29.

The secondary inlet 42 is formed in the upper portion of the cylindrical portion 33 (uppermost portion of the side wall that forms the swirl chamber 29) like the primary inlet 40. For example, the secondary inlet 42 is placed at the same height as the primary inlet 40. The secondary inlet 42 is formed to have an opening area smaller than an opening area of the primary inlet 40. One end side of the groove 44 is obliquely connected to the cylindrical portion 33 so that the dust-containing air from the bypass inlet airflow passage 28 tangentially flows into the inside of the cylindrical portion 33.

The connection portion 37 is provided to protrude outward from the cylindrical portion 33. The connection portion 37 generally has a ring shape. The connection portion 37 is placed at a substantially intermediate height of the cylindrical portion 33.

The dust collection portion case 26 includes a bottom 45, an outer wall portion 46, and a partition portion 47.

The bottom 45 generally has a circular shape. The outer wall portion 46 has a cylindrical shape having a diameter larger than a diameter of the cylindrical portion 33. The outer wall portion 46 is provided to stand upright from an edge of the bottom 45. That is, the outer wall portion 46 and the bottom 45 form a cylindrical member with one side (lower side) being closed. The partition portion 47 has a cylindrical shape having a diameter smaller than a diameter of the cylindrical portion 33. The partition portion 47 is placed inside the outer wall portion 46, and provided to stand upright from an upper surface of the bottom 45. Thus, two spaces partitioned by the partition portion 47 are formed in the dust collection portion case 26.

When the dust collection portion case 26 is placed so that the conical portion 34 is inserted from above into a space inside the partition portion 47, an upper end of the partition portion 47 comes into contact with an outer peripheral surface (or a member provided on the outer peripheral surface) of the conical portion 34 from below. The space formed inside the partition portion 47 other than the conical portion 34 forms the primary dust collection chamber 31. The primary dust collection chamber 31 communicates with the swirl chamber 29 through the primary opening 38. A part of dust separated from the dust-containing air in the swirl chamber 29 falls through the primary opening 38 into the primary dust collection chamber 31 and is collected. The primary dust collection chamber 31 is placed to cover a lower side of the conical portion 34 (lower portion of the swirl chamber 29), and surrounds the lower side.

When the dust collection portion case 26 is placed so that the conical portion 34 is inserted from above into the space inside the partition portion 47, the upper end of the outer wall portion 46 comes into contact with the edge of the connection portion 37 from below. A continuous cylindrical space formed between the outer wall portion 46 and the partition portion 47 as well as between the outer wall portion 46 and parts of the cylindrical portion 33 and the conical portion 34 forms the zero-order dust collection chamber 30. An upper side of the continuous space is closed by the connection portion 37, and a lower side thereof is closed by the bottom 45. The zero-order dust collection chamber 30 is placed to surround the lower portion of the cylindrical portion 33 and the conical portion 34 (that is, most of the swirl chamber 29), and further surround the primary dust collection chamber 31.

A zero-order opening 48 is provided in the side wall that forms the swirl chamber 29. The swirl chamber 29 communicates with the zero-order dust collection chamber 30 through the zero-order opening 48. The zero-order opening 48 is formed in a position lower than the primary inlet 40 and the secondary inlet 42 (downstream side) and a position higher than the primary opening 38 (upstream side). For example, the zero-order opening 48 is provided from the lower end of the cylindrical portion 33 to the upper end of the conical portion 34, and placed in a slightly lower position than the connection portion 37. The zero-order opening 48 is placed near the uppermost portion of the zero-order dust collection chamber 30. Thus, the zero-order dust collection chamber 30 is provided to extend downward from the zero-order opening 48.

The bypass portion case 24 includes a bottom 49, a side wall portion 50, and a discharge portion 51.

As described above, the bypass portion case 24 is placed on the bypass airflow passage forming portion 36 in close contact therewith from above. The bottom 49 has a plate shape, and an outline of the plate shape fits an inner surface of the rising portion 43.

When the bypass portion case 24 is properly placed on the inlet portion case 25, the bottom 49 is placed to close the upper side of the cylindrical portion 33. That is, an upper wall of the swirl chamber 29 is formed by the bottom 49. Also, when the bypass portion case 24 is properly placed on the inlet portion case 25, the bottom 49 is placed to close the upper side of the groove 44. That is, an upper wall of the rear half of the bypass inlet airflow passage 28 and an upper edge of the secondary inlet 42 are formed by the bottom 49.

The side wall portion 50 is provided to stand upright from the bottom 49. The side wall portion 50 is continuously formed to surround a C-shaped space on the bottom 49 (when viewed in a direction of the central axis of the swirl chamber 29). The bypass portion case 24 is covered with the discharge portion case 23 from above. The C-shaped space with a lower side being closed by the bottom 49 and a lateral side surrounded by the side wall portion 50 forms a part (front half) of the bypass inlet airflow passage 28 by the discharge portion case 23 being placed on the bypass portion case 24 to close an upper side of the space.

The bottom 49 has a first bypass opening 52 and a second bypass opening 53. The first bypass opening 52 and the second bypass opening 53 are provided in a portion surrounded by the side wall portion 50 on the bottom 49.

The first bypass opening 52 is an opening for taking the dust-containing air in the inlet airflow passage 27 (that is, the dust-containing air having passed through the bypass inlet 41) into the C-shaped space (the front half of the bypass inlet airflow passage 28). The first bypass opening 52 is formed into, for example, the same shape as the bypass inlet 41. When the bypass portion case 24 is properly mounted to the inlet portion case 25, the first bypass opening 52 is placed in the same position as the bypass inlet 41 when viewed in the direction of the central axis of the swirl chamber 29. That is, the first bypass opening 52 is placed immediately above the bypass inlet 41.

The second bypass opening 53 is an opening for taking the dust-containing air in the C-shaped space into the rear half of the bypass inlet airflow passage 28. The second bypass openings 53 of, for example, the same number as the secondary inlets 42 are provided. In this embodiment, three secondary inlets 42 (three grooves 44) are provided. Thus, the bottom 49 has three second bypass openings 53 correspondingly to the secondary inlets 42 (grooves 44). When the bypass portion case 24 is properly mounted to the inlet portion case 25, the second bypass opening 53 is placed immediately above the other end of the groove 44 (an end on the side opposite from the side with the secondary inlet 42).

The discharge portion 51 discharges air in the swirl chamber 29 to the outside of the swirl chamber 29. An internal space of the discharge portion 51 forms a part (front half) of the outlet airflow passage 32 for allowing the air in the swirl chamber 29 to flow out of the dust collection unit 13.

The discharge portion 51 is provided in a middle of the bottom 49. The discharge portion 51 extends through the bottom 49 (opens in the upper surface of the bottom 49), and protrudes downward from the bottom 49. When the bypass portion case 24 is properly mounted to the inlet portion case 25, the discharge portion 51 is placed to protrude into the swirl chamber 29 from the upper wall of the swirl chamber 29.

An upper portion of the discharge portion 51 from a predetermined intermediate position has a cylindrical shape. A lower portion of the discharge portion 51 from the intermediate position has a hollow conical shape with a diameter decreasing downward. The discharge portion 51 is vertically placed so that a central axis thereof matches the central axis of the cylindrical portion 33. Thus, the swirl chamber 29, the zero-order dust collection chamber 30, the primary dust collection chamber 31, and the internal space of the discharge portion 51 (front half of the outlet airflow passage 32) are substantially concentrically placed in the dust collection unit 13. The lower end of the discharge portion 51 is placed at the same height as, for example, a part (upper portion) of the zero-order opening 48.

The discharge portion 51 has many micropores. The micropores form a discharge opening 54 for discharging air in the swirl chamber 29 to the outside of the swirl chamber 29 (taking the air into the outlet airflow passage 32). The discharge opening 54 is provided in a higher position than the zero-order opening 48. The discharge opening 54 is also placed at the same height as the primary inlet 40 and the secondary inlet 42. The discharge opening 54 is not formed in a portion of the discharge portion 51 that the primary inlet 40 directly faces. The discharge opening 54 is formed in a portion of the discharge portion 51 that the secondary inlet 42 directly faces.

The discharge portion case 23 is formed of a case body placed on the uppermost portion of the dust collection unit 13. The discharge portion case 23 includes a lid 55 and a discharge portion 56.

When the discharge portion case 23 is properly placed on the bypass portion case 24, the lid 55 is placed to close from above the C-shaped space surrounded by the side wall portion 50. That is, the upper wall of the front half of the bypass inlet airflow passage 28 is formed by the lid 55.

An edge of the lid 55 has the same shape as the rising portion 43. Thus, the discharge portion case 23 is mounted to the bypass portion case 24 (inlet portion case 25) in one fixed direction.

The discharge portion 56 switches a traveling direction of the air having passed through the discharge portion 51 to discharge the air to the outside of the dust collection unit 13. An internal space of the discharge portion 56 forms a part (rear half) of the outlet airflow passage 32. A discharge pipe 57 includes the discharge portion 51 of the bypass portion case 24, and the discharge portion 56 of the discharge portion case 23.

The discharge portion 56 has a cylindrical shape bent into an L shape. The discharge portion 56 has one end opening downward, and the other end opening laterally. When the discharge portion case 23 is properly placed on the bypass portion case 24, one end of the discharge portion 56 is connected to the upper end of the discharge portion 51. An axial direction of the other end of the discharge portion 56 is placed orthogonally to the central axis of the swirl chamber 29 and in parallel with an axial direction of the inlet pipe 35. The other end of the discharge portion 56 forms a unit outlet 58 for allowing air to flow out of the dust collection unit 13. The unit outlet 58 opens in the same direction as the unit inlet 39. The unit outlet 58 is placed in a higher position than the unit inlet 39.

When the dust collection unit 13 having the above described configuration is properly mounted to the housing unit 12, the central axis of the swirl chamber 29 and the like is obliquely placed along an inclined surface (upper surface) of the housing body 15. Then, the unit inlet 39 and the unit outlet 58 are placed to face the inclined surface, and the unit inlet 39 is connected to the connection opening 20. The unit outlet 58 is connected to the connection opening 22.

Figure 19:
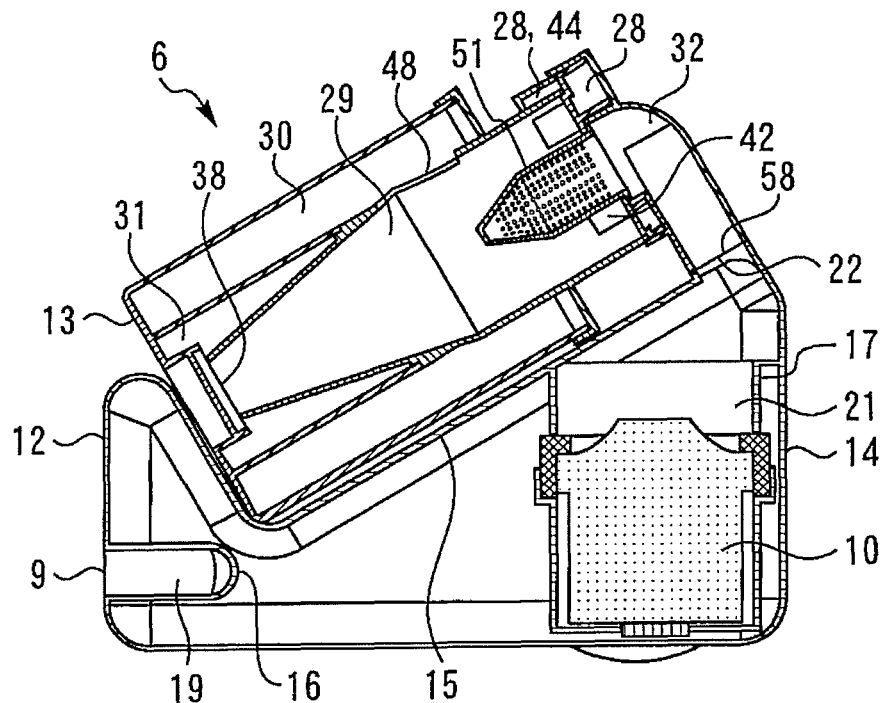
FIG. 19 is an H-H sectional view of the vacuum cleaner body of the electric vacuum cleaner in FIG. 3.
Figure 20:
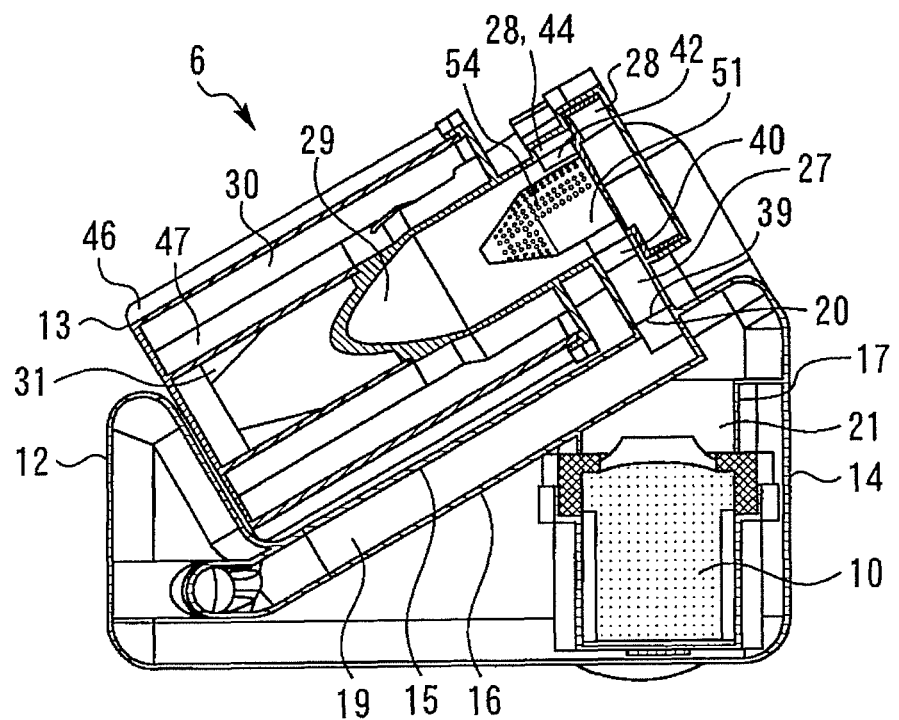
FIG. 20 is a J-J sectional view of the vacuum cleaner body of the electric vacuum cleaner in FIG. 3.

FIG. 19 is an H-H sectional view of the vacuum cleaner body of the electric vacuum cleaner in FIG. 3. FIG. 20 is a J-J sectional view of the vacuum cleaner body of the electric vacuum cleaner in FIG. 3. FIGS. 19 and 20 show the dust collection unit 13 being properly mounted to the housing unit 12.

Next, a function of the dust collection unit 13 having the above described configuration will be specifically described.

When the electric air blower 10 starts suction, the dust-containing air passes through the intake airflow passage 19 and reaches the connection opening 20 as described above. The dust-containing air successively passes through the connection opening 20 and the unit inlet 39, and flows into the inside of the inlet pipe 35, that is, into the inlet airflow passage 27. A part of the dust-containing air having flowed into the inlet airflow passage 27 travels in the axial direction of the inlet pipe 35 (travels straight), and reaches a terminal (the other end) of the inlet pipe 35. The dust-containing air having reached the terminal of the inlet pipe 35 passes through the primary inlet 40 and flows into the inside of the cylindrical portion 33 (swirl chamber 29). Such a path is shown as a path a by a solid arrow in the figures.

Meanwhile, the other part of the dust-containing air having flowed into the inlet airflow passage 27 enters a different path (path b shown by a broken arrow in the figures) in the middle of the path a.

Specifically, a part of the dust-containing air flowing through the inlet airflow passage 27 changes its traveling direction from the axial direction of the inlet pipe 35 to an upward direction, and reaches the bypass inlet 41. The dust-containing air successively passes through the bypass inlet 41 and the first bypass opening 52, and flows into a space between the bypass portion case 24 and the discharge portion case 23 (that is, the front half of the bypass inlet airflow passage 28) above the inlet portion case 25.

The dust-containing air having flowed into the bypass inlet airflow passage 28 moves in the C-shaped space surrounded by the side wall portion 50, and reaches the second bypass opening 53. In the C-shaped space, the dust-containing air moves in the swirl direction of the air in the swirl chamber 29 across the upper portion of the swirl chamber 29. The dust-containing air passes through the second bypass opening 53 and moves downward, and flows into a space between the bypass airflow passage forming portion 36 and the bottom 49 formed outside the swirl chamber 29, that is, into the groove 44 (rear half of the bypass inlet airflow passage 28).

The dust-containing air having flowed into the rear half of the bypass inlet airflow passage 28 moves in the groove 44. In the groove 44, the dust-containing air moves in the swirl direction of the air in the swirl chamber 29. When reaching one end of the groove 44, the dust-containing air passes through the secondary inlet 42 and flows into the inside of the cylindrical portion 33 (swirl chamber 29).

The dust-containing air having passed through the primary inlet 40 tangentially flows into the swirl chamber 29 along an inner peripheral surface of the cylindrical portion 33 (inner wall surface of the swirl chamber 29). The dust-containing air having passed through the secondary inlet 42 also tangentially flows into the swirl chamber 29 along the inner peripheral surface of the cylindrical portion 33.

The dust-containing air taken from the primary inlet 40 and the secondary inlet 42 into the swirl chamber 29 forms a swirl airflow that turns in a predetermined direction along the side wall in the swirl chamber 29. The swirl airflow flows downward by a path structure and gravity thereof while forming a forced vortex region near the central axis and a free vortex region outside the forced vortex region.

A centrifugal force is applied to the dust contained in the swirl airflow (air in the swirl chamber 29). For example, relatively large dust such as fiber dust or hair (such dust is hereinafter referred to as "dust $\alpha$") falls in the swirl chamber 29 while being pressed against the inner peripheral surface of the cylindrical portion 33 (inner wall surface of the swirl chamber 29) by the centrifugal force. When reaching the height of the zero-order opening 48, the dust $\alpha$ is separated from the swirl airflow, passes through the zero-order opening 48, and is fed to the zero-order dust collection chamber 30. The dust $\alpha$ having entered the zero-order dust collection chamber 30 from the zero-order opening 48 falls in the zero-order dust collection chamber 30 while moving in the same direction as the direction of the airflow swirling in the swirl chamber 29 (swirl direction). Then, the dust $\alpha$ reaches a lowermost portion of the zero-order dust collection chamber 30, and is collected.

Dust that has not entered the zero-order dust collection chamber 30 from the zero-order opening 48 travels downward while swirling in the swirl chamber 29 on the airflow in the swirl chamber 29. Relatively small dust such as sand dust or fine fiber dust (such dust is hereinafter referred to as "dust $\beta$") passes through the primary opening 38. Then, the dust $\beta$ falls into the primary dust collection chamber 31 and is collected.

When the airflow swirling in the swirl chamber 29 reaches the lowermost portion of the swirl chamber 29, the airflow changes its traveling direction to an upward direction, and rises along the central axis of the swirl chamber 29. The dust $\alpha$ and the dust $\beta$ are removed from the air that forms the rising airflow. The airflow from which the dust $\alpha$ and the dust $\beta$ are removed (clean air) passes through the discharge opening 54 and is discharged to the outside of the swirl chamber 29. The air discharged from the swirl chamber 29 passes through the inside of the discharge pipe 57 (outlet airflow passage 32), and reaches the unit outlet 58. Then, the clean air successively passes through the unit outlet 58 and the connection opening 22, and is fed to the exhaust airflow passage 21.

The electric air blower 10 performs suction, and thus as described above, the dust $\alpha$ accumulates in the zero-order dust collection chamber 30 and the dust $\beta$ accumulates in the primary dust collection chamber 31. The dust $\alpha$ and the dust β can be easily disposed of by removing the dust collection portion case 26 from the dust collection unit 13.

The dust collection unit 13 (electric vacuum cleaner 1) having the above described configuration can increase dust separation performance and reduce noise without increasing the size of the device.

In the dust collection unit 13, the bypass inlet 41 is formed in the inlet pipe 35 (wall that forms the inlet airflow passage 27), and a part of the dust-containing air flowing in the inside of the inlet pipe 35 (inlet airflow passage 27) is taken from the bypass inlet 41 into the bypass inlet airflow passage 28.

Thus, a traveling direction of the dust-containing air flowing into the bypass inlet airflow passage 28 is significantly bent in the inlet pipe 35. Among dust flowing in the inside of the inlet pipe 35 (inlet airflow passage 27), dust having a large inertia force, that is, relatively large dust other than fine dust deviates from the airflow flowing into the bypass inlet airflow passage 28 before reaching the bypass inlet 41. Only fine dust that has a small inertia force can pass through the bypass inlet 41 and flow into the bypass inlet airflow passage 28. Dust other than the fine dust passes through the inlet airflow passage 27, and is taken from the primary inlet 40 into the swirl chamber 29.

The dust collection unit 13 having the above described configuration can prevent dust from entering the bypass inlet airflow passage 28, and prevent the secondary inlet 42 and the bypass inlet airflow passage 28 from being clogged with dust. There is no need to provide another separation device for collecting large dust on the upstream side of the dust collection unit 13. This can reduce the size of the dust collection unit 13, and reduce the sizes of the vacuum cleaner body 6 and the electric vacuum cleaner 1.

In this embodiment, the case where the bypass inlet 41 is formed in the upper surface of the inlet pipe 35 (upper wall that forms the inlet airflow passage 27) has been described. However, a certain advantage can be expected by forming the bypass inlet 41 anywhere in the inlet pipe 35 (for example, the side wall forming the inlet airflow passage 27).

When the bypass inlet 41 is opened in the upper surface of the inner wall of the inlet pipe 35, a traveling direction of the dust-containing air flowing into the bypass inlet airflow passage 28 is significantly bent upward in the inlet pipe 35. The dust must move upward against the gravity in the inlet pipe 35 in order to pass through the bypass inlet 4I. This can prevent heavy dust from flowing into the bypass inlet airflow passage 28, and further prevent the secondary inlet 42 and the bypass inlet airflow passage 28 from being clogged with dust.

In the dust collection unit 13, the dust-containing air flows from the primary inlet 40 and the secondary inlet 42 into the swirl chamber 29 so as to successively push the swirl airflow in the swirl chamber 29 from behind. That is, the dust-containing air newly taken into the swirl chamber 29 flows into the swirl chamber 29 so as to accelerate the swirl airflow already formed in the swirl chamber 29. Providing the bypass inlet airflow passage 28 can increase a swirl force in the swirl chamber 29, and significantly improve a function of separating dust (separation function).

A reduction in the swirl force in the swirl chamber 29 reduces the separation function. For example, when the dust-containing air is taken only from the primary inlet into the swirl chamber, a velocity of air flowing from the primary inlet into the swirl chamber (flow velocity) must be increased to ensure a predetermined swirl force. This increases the size of the electric air blower, and increases the sizes of the vacuum cleaner body and the electric vacuum cleaner. Also in such terms, the dust collection unit 13 having the above described configuration can reduce the size of the device.

Providing the bypass inlet airflow passage 28 can reduce the flow velocity of air required for ensuring the predetermined swirl force as compared to a case without the bypass inlet airflow passage 28. Thus, providing the bypass inlet airflow passage 28 can reduce airflow noise, and reduce noise of the device.

In the dust collection unit 13, the bypass inlet airflow passage 28 is formed so that the dust-containing air moves in the swirl direction in the swirl chamber 29. For example, the front half of the bypass inlet airflow passage 28 is formed into a C shape along the swirl direction in the swirl chamber 29 in the upper portion of the swirl chamber 29. The rear half of the bypass inlet airflow passage 28 is formed along the outer peripheral surface of the cylindrical portion 33 (outer surface of the side wall that forms the swirl chamber 29).

This configuration can reduce pressure loss in the bypass inlet airflow passage 28, and allows a certain amount of air to flow from the bypass inlet airflow passage 28 into the swirl chamber 29. Since the dust-containing air from the bypass inlet airflow passage 28 smoothly merges into the swirl chamber 29, the swirl force in the swirl chamber 29 is unlikely to be reduced.

In the dust collection unit 13, the bypass inlet airflow passage 28 is formed of parts of the discharge portion case 23, the bypass portion case 24, and the inlet portion case 25. Thus, the front half of the bypass inlet airflow passage 28 is placed in the upper portion of the swirl chamber 29 so as to partially cover the swirl chamber 29. The rear half of the bypass inlet airflow passage 28 is placed around the swirl chamber 29 so as to cover the upper end of the swirl chamber 29 (portion having the primary inlet 40 and the secondary inlet 42).

In the dust collection unit 13, the airflow from the primary inlet 40 and the airflow from the secondary inlet 42 merge with each other in the swirl chamber 29, and swirl at high speed. The flow velocity of air flowing in the bypass inlet airflow passage 28 is lower than that of air swirling in the swirl chamber 29. Thus, the bypass inlet airflow passage 28 is placed outside the swirl chamber 29 so as to cover the swirl chamber 29, and thus airflow noise generated in the swirl chamber 29 can be blocked by the bypass inlet airflow passage 28 to reduce noise leaking outside.

Similarly, the bypass inlet airflow passage 28 is placed outside the discharge pipe 57 so as to cover a part of the discharge pipe 57. In particular, the rear half of the bypass inlet airflow passage 28 is placed to surround the discharge portion 51 having the discharge opening 54. With this configuration, airflow noise generated when the air in the swirl chamber 29 passes through the discharge opening 54 can be blocked by the bypass inlet airflow passage 28 to reduce noise leaking outside.

Further, the dust collection unit 13 may have a configuration described below.

For example, a part on one axial end side of a substantially cylindrical side wall that forms the swirl chamber 29 is opened to form the primary inlet 40. Also, in the inner wall of the inlet pipe 35, the bypass inlet 41 is formed to open in a direction on one axial end side of the substantially cylindrical side wall that forms the swirl chamber 29. In this case, most of the airflow and the dust flowing straight through the inlet airflow passage 27 into the swirl chamber 29 moves in a direction on the other axial end side of the substantially cylindrical side wall that forms the swirl chamber 29 (downward in FIG. 12), while the airflow entering the bypass inlet airflow passage 28 from the inlet airflow passage 27 moves in the direction on the one axial end side of the substantially cylindrical side wall that forms the swirl chamber 29 (upward in FIG. 12). Thus, dust entering the bypass inlet airflow passage 28 can be further reduced to prevent the secondary inlet 42 and the bypass inlet airflow passage 28 from being clogged with dust.

Also, for example, an area (opening area) of the bypass inlet 41 is smaller than an area (opening area) of the primary inlet 40. Reducing the opening area of the bypass inlet 41 can further reduce dust entering the bypass inlet airflow passage 28. This can prevent the secondary inlet 42 and the bypass inlet airflow passage 28 from being clogged with dust.

Also, the area (opening area) of the bypass inlet 41 is smaller than the area (opening area) of the secondary inlet 42. Dust entering the bypass inlet airflow passage 28 has a size such as to pass through the bypass inlet 41. The opening area of the secondary inlet 42 being larger than the opening area of the bypass inlet 41 can reliably prevent the secondary inlet 42 from being clogged with dust.

Also, the area (opening area) of the bypass inlet 41 is smaller than a sectional area of the bypass inlet airflow passage 28. In particular, the opening area of the bypass inlet 41 is smaller than a sectional area of a narrowest portion (minimum sectional area) of the bypass inlet airflow passage 28. Dust entering the bypass inlet airflow passage 28 has a size such as to pass through the bypass inlet 41. The sectional area of the bypass inlet airflow passage 28 being larger than the opening area of the bypass inlet 41 can reliably prevent the bypass inlet airflow passage 28 from being clogged with dust.

Also, when a plurality of secondary inlets 42 are formed, secondary inlets placed on more downstream side have a larger opening area. For example, as in this embodiment, a case where a second secondary inlet 42, a first secondary inlet 42 placed on a more upstream side of the second secondary inlet 42, and a third secondary inlet 42 placed on a more downstream side than the second secondary inlet 42 is considered. In such a case, the first secondary inlet 42 has a smallest opening area. The third secondary inlet 42 has a largest opening area.

When the plurality of secondary inlets 42 are formed, the dust-containing air flowing from the secondary inlet 42 on the downstream side into the swirl chamber 29 moves in the bypass inlet airflow passage 28 a longer distance than the dust-containing air flowing from the secondary inlet 42 on the upstream side into the swirl chamber 29. Moving the longer distance increases pressure loss. Using this configuration can equalize pressure loss in each path of the bypass inlet airflow passage 28. That is, an amount of airflow flowing from each secondary inlet 42 into the swirl chamber 29 can be equalized. This prevents a swirl airflow in the swirl chamber 29 from being largely disturbed by the airflow from the secondary inlet 42, and can increase dust separation performance.

Embodiment 2

Figure 21:
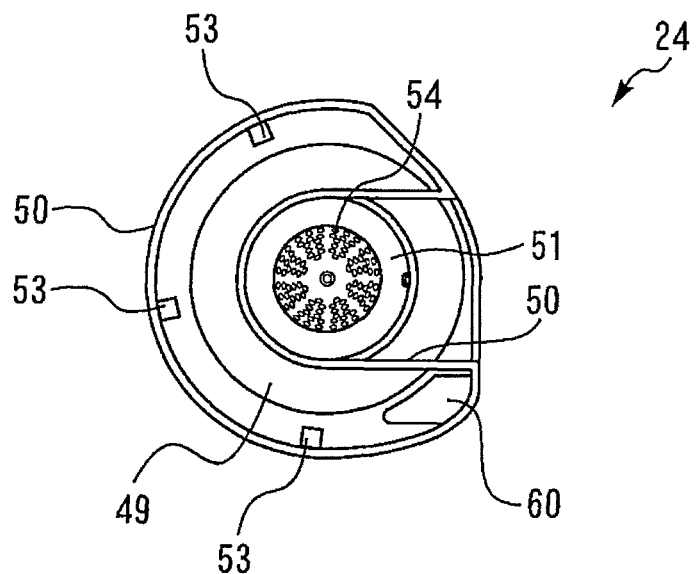
FIG. 21 is a plan view showing a bypass portion case in a dust collection unit of an electric vacuum cleaner according to Embodiment 2 of the present invention.
Figure 22:
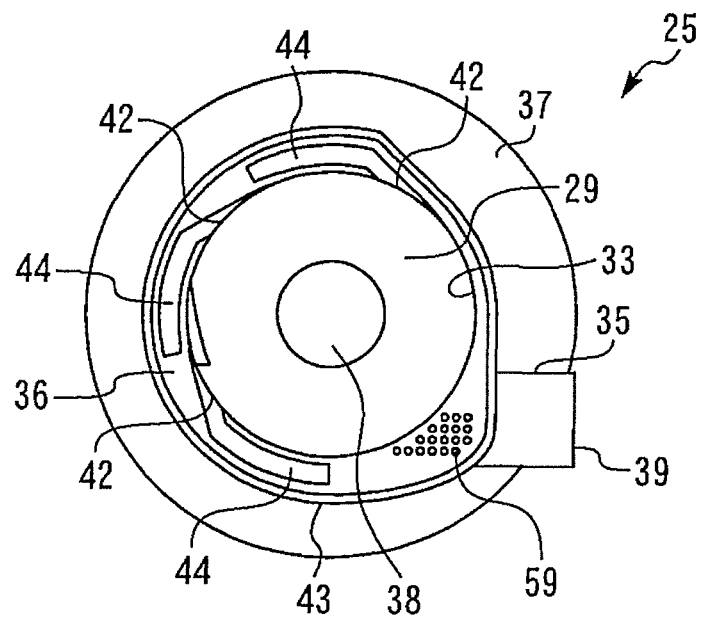
FIG. 22 is a plan view showing an inlet portion case in the dust collection unit of the electric vacuum cleaner according to Embodiment 2 of the present invention.

FIG. 21 is a plan view showing a bypass portion case in a dust collection unit of an electric vacuum cleaner according to Embodiment 2 of the present invention. FIG. 22 is a plan view showing an inlet portion case in the dust collection unit of the electric vacuum cleaner according to Embodiment 2 of the present invention.

As shown in FIGS. 21 and 22, in an inlet portion case 25 in this embodiment, many bypass inlets 59 (micropores) communicating with an internal space of an inlet pipe 35 (inlet airflow passage 27) is formed in an upper surface of the inlet pipe 35. With such a configuration, even a small opening area of each bypass inlet 59 can increase an area of the entire opening (total opening area), and pressure loss near an entry of a bypass inlet airflow passage 28 can be reduced. That is, such a configuration can prevent large dust from entering the bypass inlet airflow passage 28 while ensuring a sufficient flow of air into the bypass inlet airflow passage 28.

A bypass portion case 24 has a first bypass opening 60 in a bottom 49 so as not to close the bypass inlet 59. The first bypass opening 60 is formed, for example, across a predetermined range so that all the bypass inlets 59 are placed in the opening when the bypass portion case 24 is properly mounted to the inlet portion case 25.

Also, the dust collection unit 13 having the above described configuration may adopt a configuration described below.

For example, each of the micropores (one bypass inlet 59) has an opening area smaller than an opening area of a secondary inlet 42. Dust entering the bypass inlet airflow passage 28 has a size such as to pass through the bypass inlet 59. The secondary inlet 42 having the opening area larger than the opening area of the bypass inlet 59 can reliably prevent the secondary inlet 42 from being clogged with dust.

Also, for example, each of the micropores (one bypass inlet 59) has an opening area smaller than a sectional area of the bypass inlet airflow passage 28. In particular, each of the micropores has an opening area smaller than a minimum sectional area of the bypass inlet airflow passage 28. Dust entering the bypass inlet airflow passage 28 has a size such as to pass through the bypass inlet 59. The bypass inlet airflow passage 28 having the sectional area larger than the area of the bypass inlet 59 can reliably prevent the bypass inlet airflow passage 28 from being clogged with dust.

Other configurations are the same as those disclosed in Embodiment 1.

Embodiment 3

Figure 23:
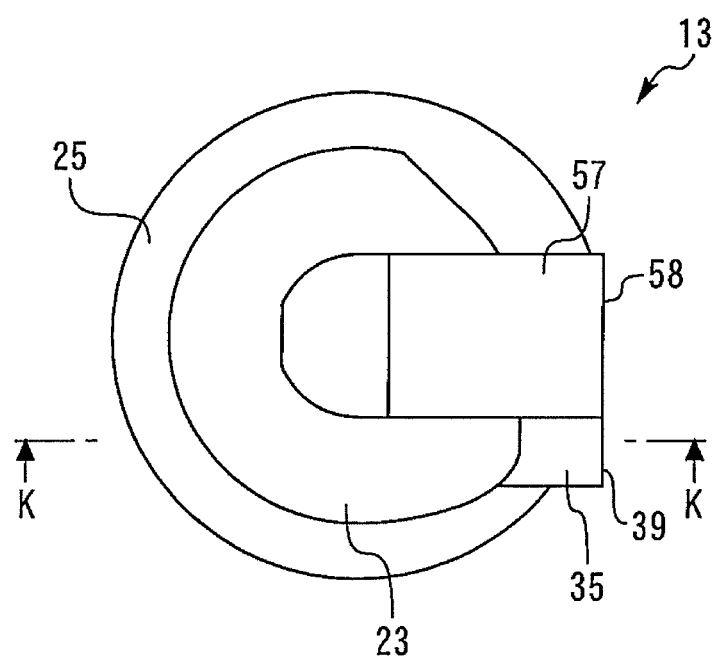
FIG. 23 is a plan view showing a dust collection unit of an electric vacuum cleaner according to Embodiment 3 of the present invention.
Figure 24:
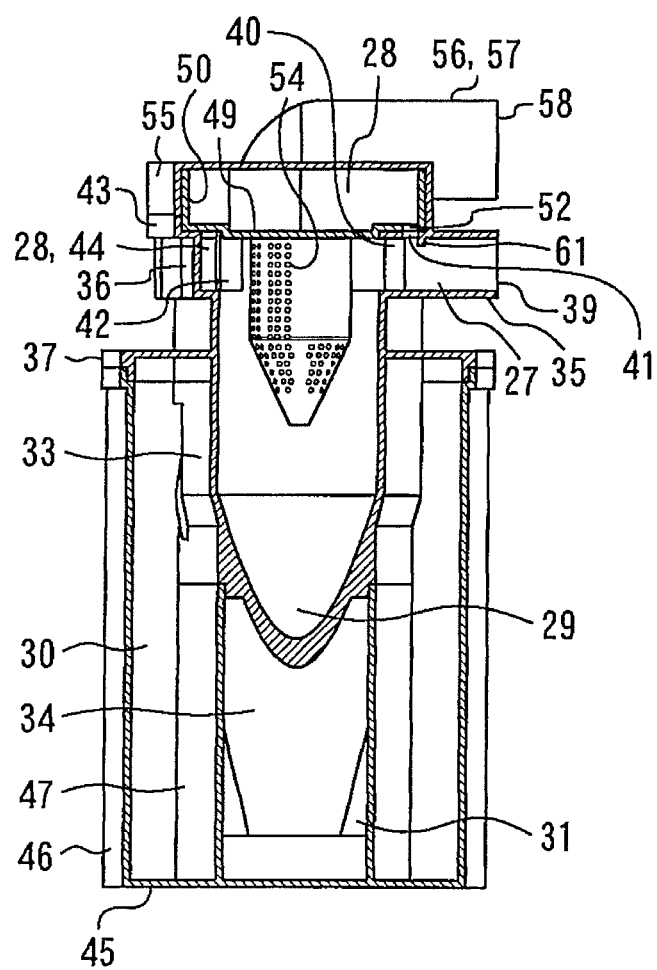
FIG. 24 is a K-K sectional view of the dust collection unit in FIG. 23.

FIG. 23 is a plan view showing a dust collection unit of an electric vacuum cleaner according to Embodiment 3 of the present invention. FIG. 24 is a K-K sectional view of the dust collection unit in FIG. 23.

As shown in FIG. 24, in an inlet portion case 25 in this embodiment, a rib 61 is provided on an inlet pipe 35. The rib 61 is provided to protrude from an inner wall surface of the inlet pipe 35 into an internal space (inside) thereof. The rib 61 is placed on an immediately upstream side of a bypass inlet 41, and along an upstream edge of the bypass inlet 41.

In this embodiment, the bypass inlet 41 is provided on an upper wall that forms an inlet airflow passage 27, and opens in an upper surface of an inner wall of the inlet pipe 35. Thus, the rib 61 is placed in the inlet airflow passage 27 so as to protrude downward from the upper surface of the inner wall of the inlet pipe 35. Also, the rib 61 is placed to cover (surround) the entire upstream edge of the bypass inlet 41 from the upstream side.

In the dust collection unit 13 having the above described configuration, dust flowing in the inlet airflow passage 27 must bypass the rib 61 to enter a bypass inlet airflow passage 28. When the dust bypasses the rib 61, a traveling direction of the dust is largely bent, and thus large dust deviates from an airflow flowing into the bypass inlet airflow passage 28 during bypassing. Thus, providing the rib 61 further prevents dust from entering the bypass inlet airflow passage 28.

Other configurations are the same as the configurations disclosed in Embodiment 1 or 2.

Embodiment 4

Figure 25:
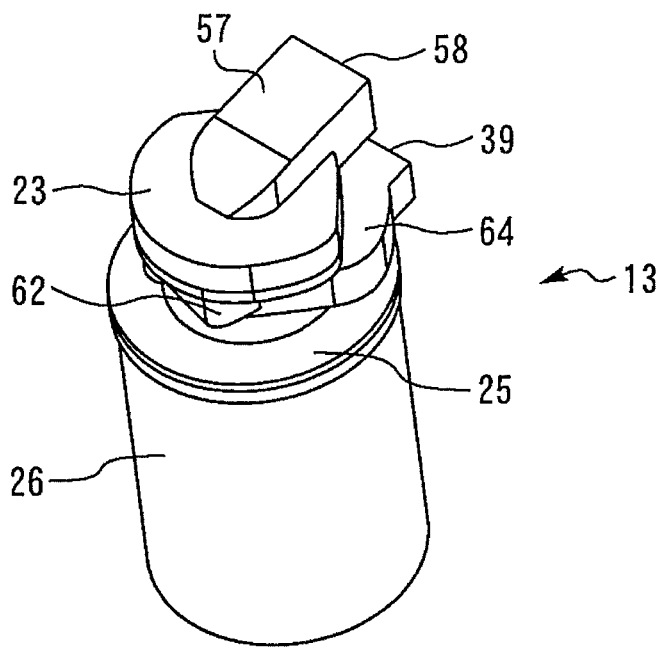
FIG. 25 is a perspective view showing a dust collection unit of an electric vacuum cleaner according to Embodiment 4 of the present invention.
Figure 26:
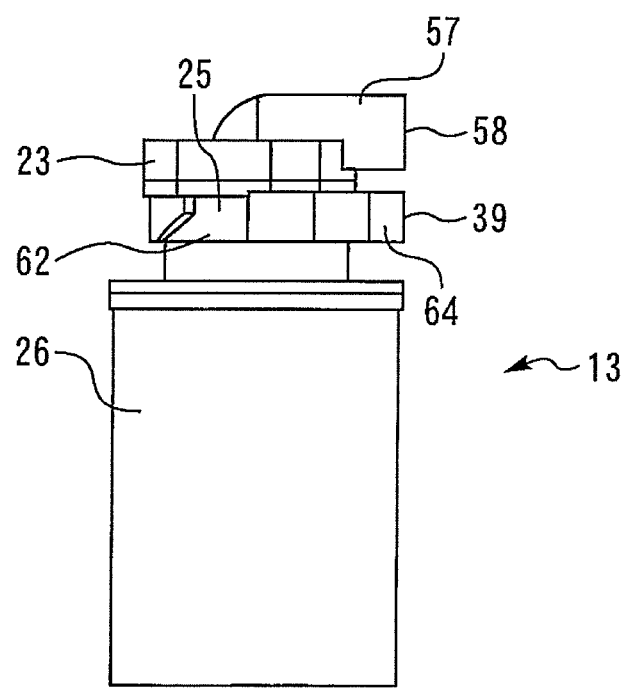
FIG. 26 is a side view showing the dust collection unit of the electric vacuum cleaner according to Embodiment 4 of the present invention.
Figure 27:
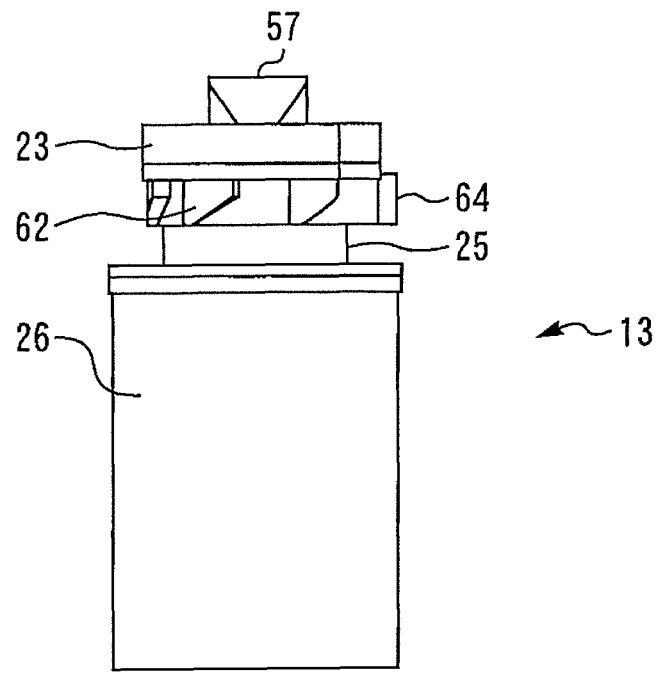
FIG. 27 is a front view showing the dust collection unit of the electric vacuum cleaner according to Embodiment 4 of the present invention.
Figure 28:
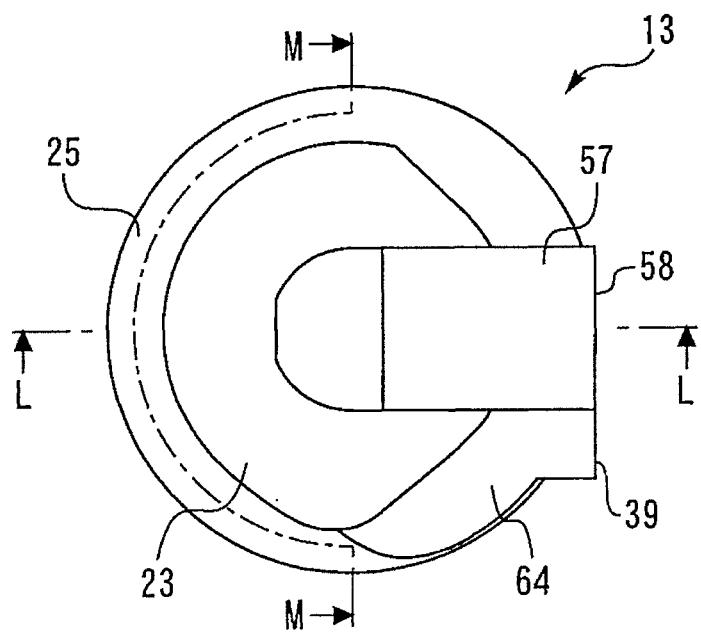
FIG. 28 is a plan view showing the dust collection unit of the electric vacuum cleaner according to Embodiment 4 of the present invention.
Figure 29:
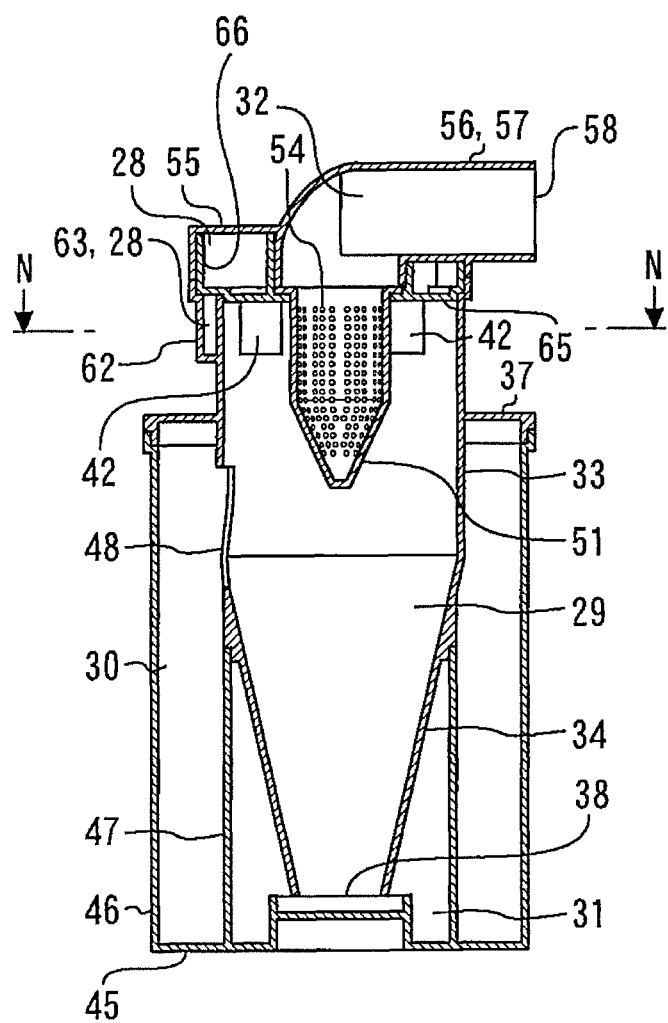
FIG. 29 is an L-L sectional view of the dust collection unit in FIG. 28.
Figure 30:
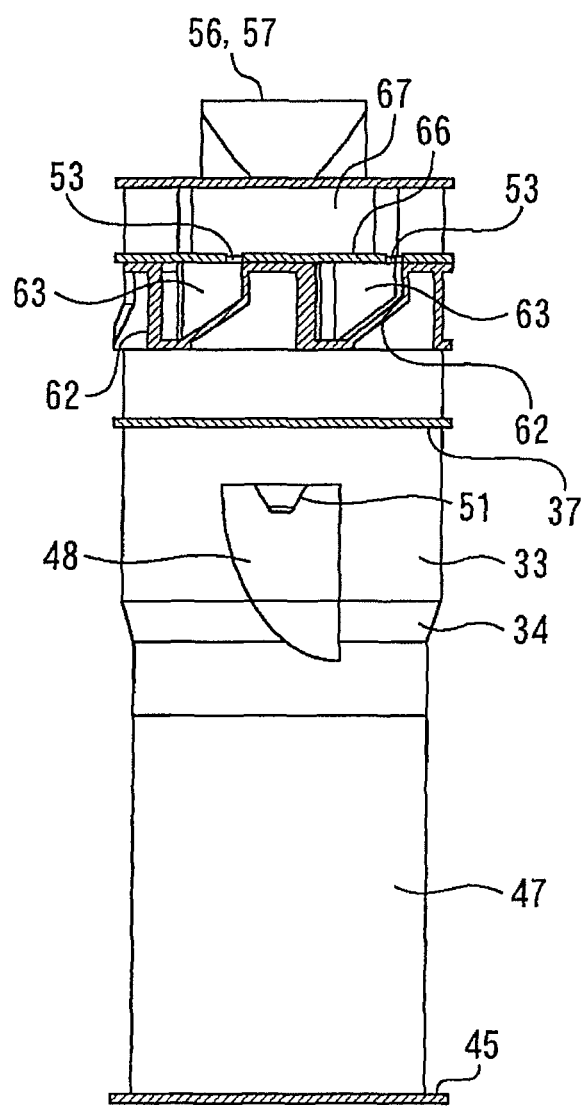
FIG. 30 is an M-M sectional view of the dust collection unit in FIG. 28.
Figure 31:
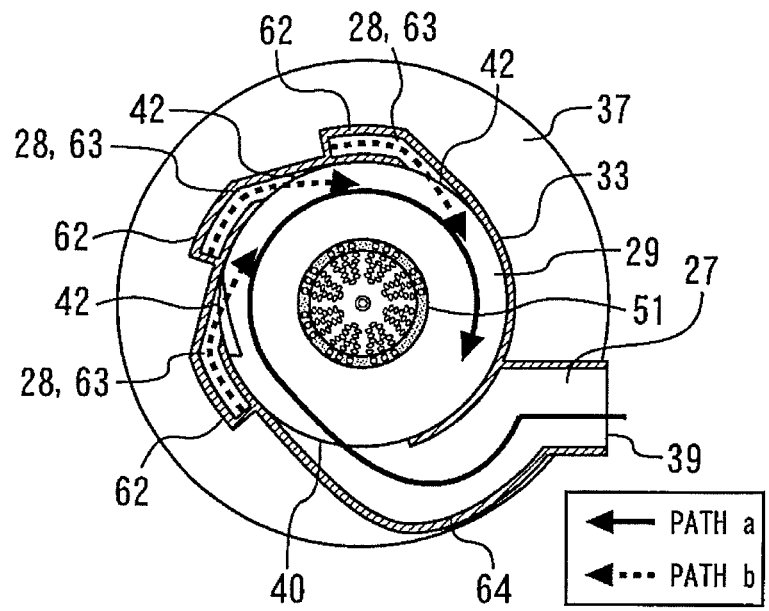
FIG. 31 is an N-N sectional view of the dust collection unit in FIG. 29.
Figure 32:
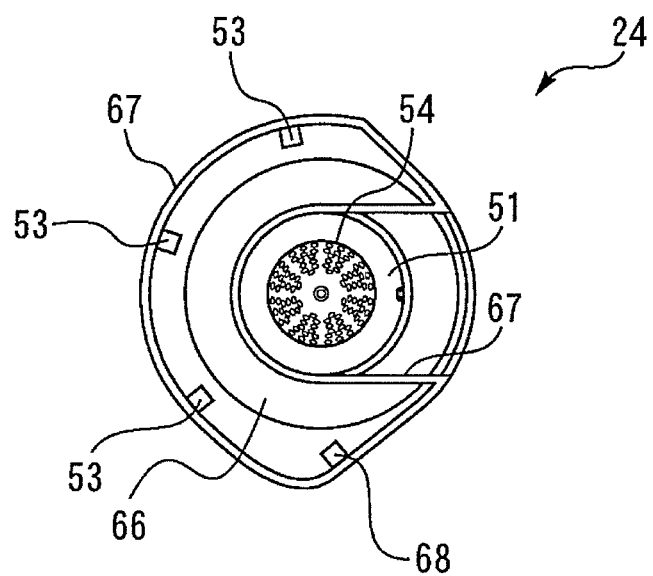
FIG. 32 is a plan view showing a bypass portion case in the dust collection unit of the electric vacuum cleaner according to Embodiment 4 of the present invention.
Figure 33:
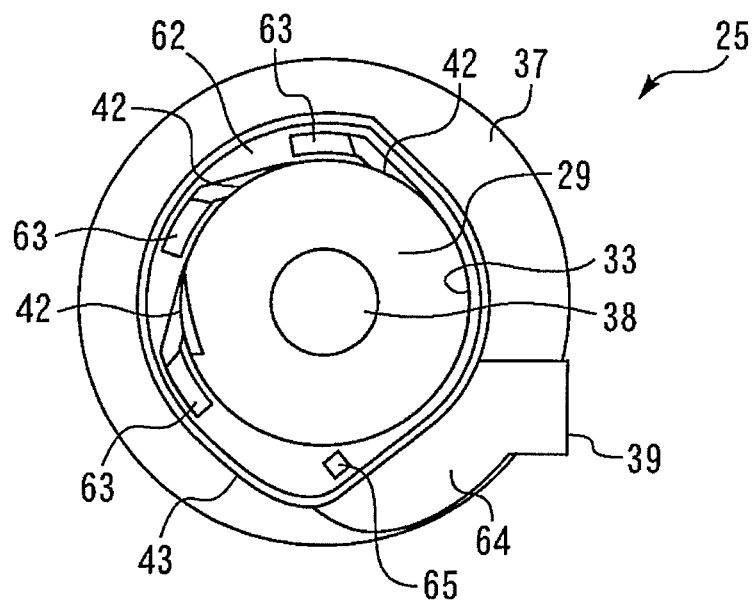
FIG. 33 is a plan view showing an inlet portion case in the dust collection unit of the electric vacuum cleaner according to Embodiment 4 of the present invention.

FIG. 25 is a perspective view showing a dust collection unit of an electric vacuum cleaner according to Embodiment 4 of the present invention. FIG. 26 is a side view showing the dust collection unit of the electric vacuum cleaner according to Embodiment 4 of the present invention. FIG. 27 is a front view showing the dust collection unit of the electric vacuum cleaner according to Embodiment 4 of the present invention. FIG. 28 is a plan view showing the dust collection unit of the electric vacuum cleaner according to Embodiment 4 of the present invention. FIG. 29 is an L-L sectional view of the dust collection unit in FIG. 28. FIG. 30 is an M-M sectional view of the dust collection unit in FIG. 28. FIG. 31 is an N-N sectional view of the dust collection unit in FIG. 29. FIG. 32 is a plan view showing a bypass portion case in the dust collection unit of the electric vacuum cleaner according to Embodiment 4 of the present invention. FIG. 33 is a plan view showing an inlet portion case in the dust collection unit of the electric vacuum cleaner according to Embodiment 4 of the present invention.

The groove 44 in Embodiments 1 to 3 is formed at the same depth from the upstream end (other end) to the downstream end (one end). That is, the bottom surface of the groove 44 (rear half of the bypass inlet airflow passage 28) is formed to be flat. In this embodiment, a bypass airflow passage forming portion 62 is provided on a cylindrical portion 33 so as to surround the cylindrical portion 33, and three grooves 63 are formed in the bypass airflow passage forming portion 62. The groove 63 has the same configuration as the groove 44 except for the bottom surface.

Dust-containing air in the front half of the bypass inlet airflow passage 28 passes through the second bypass opening 53 and moves downward. Thus, if the bottom surface is formed to be flat as in the groove 44, dust is prone to accumulate on the other end side (the side opposite from the side with a secondary inlet 42). In the groove 63, the bottom surface on the other end side, that is, the bottom surface located below the second bypass opening 53 is obliquely formed so as to be lowered toward one end side (downstream side). Thus, dust having entered the groove 63 from the second bypass opening 53 successively moves to the one end side, and flows from the secondary inlet 42 into a swirl chamber 29. Adopting this configuration can reliably prevent the groove 63 (rear half of the bypass inlet airflow passage 28) from being clogged with dust.

Also, the inlet pipe 35 in Embodiments 1 to 3 is formed of the straight member. On the other hand, an inlet pipe 64 in this embodiment is partially formed into an arcuate shape along an outer peripheral surface of a cylindrical portion 33 (outer surface of a side wall that forms a swirl chamber 29) outside the cylindrical portion 33. An opening in the other end of the inlet pipe 64 is a primary inlet 40.

The bypass inlet 65 is formed in an upper surface of the curved portion of the inlet pipe 64. That is, the bypass inlet 65 opens in an upper surface of an inner wall of the curved portion of the inlet pipe 64. Also, the bypass inlet 65 is placed closer to an inner side wall (in this embodiment, a part of the cylindrical portion 33 also serves as the inner side wall) between curved side walls that form the curved portion of the inlet pipe 64. A predetermined distance is ensured between the bypass inlet 65 and a curved outer side wall.

A centrifugal force is applied to dust passing through the inlet pipe 64 when the dust passes through the curved portion. Thus, the dust passes near the outer side wall in the curved portion of the inlet pipe 64. Forming the bypass inlet 65 closer to the inner side wall can prevent dust (particularly, dust having a large inertia force) from flowing into the bypass inlet airflow passage 28, and further prevent the secondary inlet 42 and the bypass inlet airflow passage 28 from being clogged with dust.

In the bypass portion case 24, parts of the bottom 66 and the side wall portion 67 are formed to protrude outward in accordance with the configuration of the inlet pipe 64. Also, a first bypass opening 68 is formed immediately above the bypass inlet 65.

Other configurations are the same as the configurations disclosed in any of Embodiments 1 to 3.

In Embodiments 1 to 4 above, the electric vacuum cleaner 1 of the canister type has been described, but the present invention may be applied to an electric vacuum cleaner of a different type.

Industrial Applicability

The present invention may be applied to a cyclone separation device, and an electric vacuum cleaner.

Reference Signs List 1 electric vacuum cleaner
2 suction opening body
3 suction pipe
4 connection pipe
5 suction hose
6 vacuum cleaner body
7 handle
8 operation switch
9 hose connection opening
10 electric air blower
11 power cord
12 housing unit
13 dust collection unit
14, 15 housing body
15a housing portion
16 intake airflow passage forming portion
17 exhaust airflow passage forming portion
18 wheel
19 intake airflow passage
20, 22 connection opening
21 exhaust airflow passage
23 discharge portion case
24 bypass portion case
25 inlet portion case
26 dust collection portion case
27 inlet airflow passage
28 bypass inlet airflow passage
29 swirl chamber
30 zero-order dust collection chamber
31 primary dust collection chamber
32 outlet airflow passage
33 cylindrical portion
34 conical portion
35, 64 inlet pipe
36, 62 bypass airflow passage forming portion
37 connection portion
38 primary opening
39 unit inlet
40 primary inlet
41, 59, 65 bypass inlet
42 secondary inlet
43 rising portion
44, 63 groove
45 bottom
46 outer wall portion
47 partition portion
48 zero-order opening
49, 66 bottom
50, 67 side wall portion
51, 56 discharge portion
52, 60, 68 first bypass opening
53 second bypass opening
54 discharge opening
55 lid
57 discharge pipe
58 unit outlet
61 rib

The invention claimed is:

1. A cyclone separation device comprising:
a swirl chamber that swirls, along a side wall thereof, dust-containing air entered from a primary and a secondary inlets of the swirl chamber, and separates dust from the dust-containing air;
a dust collection chamber that collects the dust separated by the swirl chamber;
a discharge pipe having a discharge opening for discharging air in the swirl chamber;
an inlet pipe that allows the dust-containing air to flow from the primary inlet into the swirl chamber;
a bypass inlet connected to the inlet pipe; and
a bypass inlet airflow passage that allows the dust-containing air to enter thereinto from the bypass inlet and to flow from the secondary inlet into the swirl chamber.

2. The cyclone separation device according to claim 1, wherein the bypass inlet opens in an upper surface of an inner wall of the inlet pipe.

3. The cyclone separation device according to claim 1, comprising a substantially cylindrical side wall that forms the swirl chamber, a part of the side wall on one axial end side being opened to form the primary inlet,
wherein the bypass inlet is formed to open in a direction on the one axial end side of the side wall in an inner wall of the inlet pipe.

4. The cyclone separation device according to claim 1, wherein the bypass inlet has an opening area smaller than an opening area of the primary inlet.

5. The cyclone separation device according to claim 1, wherein the bypass inlet has an opening area smaller than an opening area of the secondary inlet.

6. The cyclone separation device according to claim 1, wherein the bypass inlet has an opening area smaller than a minimum sectional area of the bypass inlet airflow passage.

7. The cyclone separation device according to claim 1, wherein the bypass inlet includes a plurality of micropores formed in the inlet pipe.

8. The cyclone separation device according to claim 7, wherein each of the micropores has an opening area smaller than an opening area of the secondary inlet.

9. The cyclone separation device according to claim 7, wherein each of the micropores has an opening area smaller than a minimum sectional area of the bypass inlet airflow passage.

10. The cyclone separation device according to claim 1, comprising a rib that is provided on the inlet pipe, protrudes inward from an inner wall surface of the inlet pipe, and is placed along an upstream edge of the bypass inlet.

11. The cyclone separation device according to claim 1, wherein the bypass inlet airflow passage is formed so that dust-containing air moves in a direction of air swirling in the swirl chamber.

12. The cyclone separation device according to claim 1, wherein
a bypass opening through which dust-containing air passes when moving downward is formed in the bypass inlet airflow passage, and
the bypass inlet airflow passage is formed so that a bottom surface located below the bypass opening is obliquely formed so as to be lowered toward a downstream side.

13. The cyclone separation device according to claim 1, wherein
a part of the inlet pipe is formed into an arcuate shape along a side wall of the swirl chamber, and
the bypass inlet opens in an upper surface of an inner wall of the part of the inlet pipe, and is placed closer to an inner side wall between curved side walls that form the part.

14. The cyclone separation device according to claim 1, wherein
the secondary inlet includes
a first secondary inlet, and
a second secondary inlet placed on a more downstream side than the first secondary inlet, and
the second secondary inlet has an opening area larger than an opening area of the first secondary inlet.

15. The cyclone separation device according to claim 1, wherein the bypass inlet airflow passage is provided outside the swirl chamber so that at least a part thereof covers a part of the swirl chamber.

16. The cyclone separation device according to claim 1, wherein the bypass inlet airflow passage is provided outside the discharge pipe so that at least a part thereof covers a part of the discharge pipe.

17. An electric vacuum cleaner comprising:
a cyclone separation device according to claim 1; and
an air blower for generating a predetermined airflow in the cyclone separation device.

18. The cyclone separation device according to claim 1, wherein the secondary inlet has an opening area smaller than an opening area of the primary inlet.

* * * * *